United States Patent
Gogineni et al.

(10) Patent No.: US 6,225,941 B1
(45) Date of Patent: *May 1, 2001

(54) SWEPT-STEP RADAR SYSTEM AND DETECTION METHOD USING SAME

(75) Inventors: Sivaprasad Gogineni; Pannirselvam Kanagaratnam, both of Lawrence, KS (US)

(73) Assignee: University of Kansas, Center for Research, Inc., Lawrence, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/233,629

(22) Filed: Jan. 19, 1999

(51) Int. Cl.$^7$ .............................. G01S 13/88; G01V 3/12
(52) U.S. Cl. ............................ 342/22; 342/128; 342/192
(58) Field of Search ............................... 342/22, 27, 127, 342/128, 129, 192, 194, 196

(56) References Cited

U.S. PATENT DOCUMENTS

| | | | |
|---|---|---|---|
| 5,339,080 | * 8/1994 | Steinway et al. | 342/22 |
| 5,357,253 | * 10/1994 | Van Etten et al. | 342/22 |
| 5,867,117 | * 2/1999 | Gogineni et al. | 342/22 |
| 5,942,688 | * 8/1999 | Kimura et al. | 73/598 |

OTHER PUBLICATIONS

Anderson, V.H., *High Altitude, Side–Looking Radar Images of Sea Ice in the Arctic*, Proceedings of the Fourth Symposium on Remote Sensing of the Environment, Willow Run Laboratory, Ann Arbor, Michigan, 1966, pp. 845–857.

Beaven et al., S., *Radar Backscatter Measurements From Simulated Sea Ice During CRRELEX '90*, University of Kansas, Jun. 1993, pp. 9–19, 35–47.

Beaven et al., S., *Radar Backscatter Measurements From Arctic Sea Ice During The Fall Freeze–Up*, Remote Sensing Reviews, Feb. 1993, pp. 2–9, 15–23, 55–59.

Beaven, S., *Sea Ice Radar Backscatter Modeling, Measurements, and the Fusion of Active and Passive Microwave Data*, Ph.D. Dissertation, University of Kansas, Mar. 1995, pp. 8–56.

Beaven et al., S., *Shipborne Radar Backscatter Measurements from Arctic Sea Ice During the Fall Freeze–Up*, Remote Sensing Reviews, 1994, vol. 9, pp. 9–14.

Deschamps, G.A., *Impedance of an Antenna in a Conducting Medium*, IRE Transactions on Antennas and Propagation, Sep. 1962, pp. 648–650.

Drinkwater et al., M.R., *C–band backscatter measurements of winter sea–ice in the Weddell Sea, Antarctica*, International Journal of Remote Sensing, vol. 16, No. 17, 1995, pp. 3365–3389.

(List continued on next page.)

Primary Examiner—John B. Sotomayor
(74) *Attorney, Agent, or Firm*—Altera Law Group, LLC

(57) ABSTRACT

An apparatus and method for detecting an object and determining the range of the object is disclosed. A transmitter, coupled to an antenna, transmits a frequency-modulated probe signal at each of a number of center frequency intervals or steps. A receiver, coupled to the antenna when operating in a monostatic mode or, alternatively, to a separate antenna when operating in a bistatic mode, receives a return signal from a target object resulting from the probe signal. Magnitude and phase information corresponding to the object are measured and stored in a memory at each of the center frequency steps. The range to the object is determined using the magnitude and phase information stored in the memory. The present invention provides for high-resolution probing and object detection in short-range applications. The present invention has a wide range of applications including high- resolution probing of geophysical surfaces and ground- penetration applications. The invention may also be used to measure the relative permittivity of materials.

34 Claims, 31 Drawing Sheets

OTHER PUBLICATIONS

Gogineni, S.P., *Radar Backscatter from Summer and Ridged Sea Ice, and Design of Short–Range Radars*, Ph.D. Disseration, University of Kansas, 1984, pp. 92–114.

Gogineni et al., S., *Application of Plane Waves for Accurate Measurement of Microwave Scattering from Geophysical Surfaces*, IEEE Transactions on Geoscience and Remote Sensing, May 1995, vol. 33, No. 3 pp. 627–633.

Jezek et al., K., *Microwave Scattering from Saline Ice Using Plane Wave Illumination*, Digest IGARSS '94, 1994, pp. 493–495.

Smith, G., *Measurement of the Electrical Constitutive Parameters of Materials Using Antennas*, IEEE Transactions on Antennas and Propagation, vol. AP–33, No. 7, 1985, pp. 783–792.

Brochure for Model 1000B, Stepped–FM Ground Penetrating Radar, GeoRadar Inc., 19623 Via Escuela Drive, Saratoga, CA 95070.

Trade Periodical page for Stepped–FM Ground-Penetrating Radar, GeoRadar Inc.

\* cited by examiner

FIG. 10

| LABEL LIST |||
|---|---|---|
| Sawtooth | 2.00 V | ac voltage |
| P2 | 15.00 V | battery |
| P1 | 15.00 V | battery |
| P1 | 15.00 V | battery |
| C5 | 10.00pF | capacitor |
| L1 | 2.00µH | inductor |
| Q2 | npn | npn bjt |
| Q2 | npn | npn bjt |
| AMP2 | opamp | opamp |
| AMP4 | opamp | opamp |
| AMP1 | opamp | opamp |
| AMP3 | opamp | opamp |
| Q1 | pnp | pnp bjt |
| Q1 | pnp | pnp bjt |
| R11 | 5.60kΩ | resistor |
| POT3 | 5.00kΩ | resistor |
| R4 | 5.60kΩ | resistor |
| R6 | 4.70kΩ | resistor |
| POT2 | 10.00kΩ | resistor |
| POT1 | 5.00kΩ | resistor |
| R9 | 22.00 Ω | resistor |
| R1 | 0.50 Ω | resistor |
| R5 | 5.60kΩ | resistor |
| R3 | 2.70kΩ | resistor |
| R14 | 22.00 Ω | resistor |
| R2 | 2.70kΩ | resistor |
| R1 | 150.00 Ω | resistor |
| D1 | 10 V | zener diode |

SWEPT-STEP RADAR SYSTEM AND DETECTION METHOD USING SAME

FIELD OF THE INVENTION

The present invention relates generally to detection systems and methods, and, more particularly, to radar systems and detection methods.

BACKGROUND OF THE INVENTION

Various types of radar systems and target detection techniques are known. Two radar systems capable of detecting a target object at a relatively short-range include the step-frequency radar and the frequency-modulated, continuous-wave radar.

A step-frequency radar produces a carrier signal having a frequency that is stepped by predetermined interval frequencies. Return signals are processed at each of the intervals or steps from which range information is determined. Two significant limitations associated with the use of a step-frequency radar in short-range applications are its limited unambiguous ranging capability and the significant difficulty of implementing range gating for short-range applications. Range gating, in general terms, is a technique that improves the sensitivity of a short-range radar by suppressing reflections up to the point of the antenna reflection. Such undesirable reflections, if left unabated, would generally render undetectable the relatively low energy return signals received from a short-range target object.

When a step-frequency radar is operated monostatically, for example, the return signal is corrupted by reflections from the antenna feed, which significantly degrades the sensitivity of the system. Although range gating for a step-frequency radar is technically implementable, very fast switches must be employed on the transmit and receive channels to gate out undesired antenna reflections. Because switching times must be on the order of nanoseconds in typical short-range applications, a range gating implementation for a step-frequency radar which utilizes such switches is complex, costly, and is often unable to reliably provide for relatively large unambiguous step frequency ranges. It is noted that the range of the step-frequency radar is limited by the number of its frequency steps.

Several of the problems associated with the step-frequency radar may be overcome by using a frequency-modulated, continuous-wave radar system, although this approach has associated with it a number of deficiencies and limitations that negatively impact the efficacy of such radars in short-range applications. Although a frequency-modulated, continuous-wave radar approach offers the opportunity to implement range gating in a generally straightforward manner and typically provides for an unambiguous ranging capability superior to that of a step-frequency radar, the resolution of the frequency-modulated, continuous-wave radar is significantly poorer than that of a step-frequency radar.

There exists a need for a radar system and detection method that overcomes these and other limitations associated with step-frequency and frequency-modulated, continuous-wave radars. There exists a further need for such a system and method that provides for accurate target detection and range determination in short-range applications. The present invention fulfills these and other needs.

SUMMARY OF THE INVENTION

The present invention is directed to an apparatus and method for detecting an object and determining the range of the object. In accordance with the general principles of the present invention, a transmitter, coupled to an antenna, transmits a frequency-modulated probe signal at each of a number of center frequency intervals or steps. A receiver, coupled to the antenna when operating in a monostatic mode or, alternatively, to a separate receive antenna when operating in a bistatic mode, receives a return signal from a target object resulting from the probe signal. Magnitude and phase information corresponding to the object are measured and stored in a memory at each of the center frequency steps. The range to the object is determined using the magnitude and phase information stored in the memory.

The present invention provides for high-resolution probing and object detection in short-range applications. The present invention has a wide range of applications including high-resolution probing of geophysical surfaces and ground-penetration applications. The invention may also be used to measure the relative permittivity of materials.

BRIEF DESCRIPTION OF THE DRAWINGS

FIG. 10 is a table of component identification and value information for the components illustrated in FIG. 9;

DETAILED DESCRIPTION OF THE VARIOUS EMBODIMENTS

Figure 1:
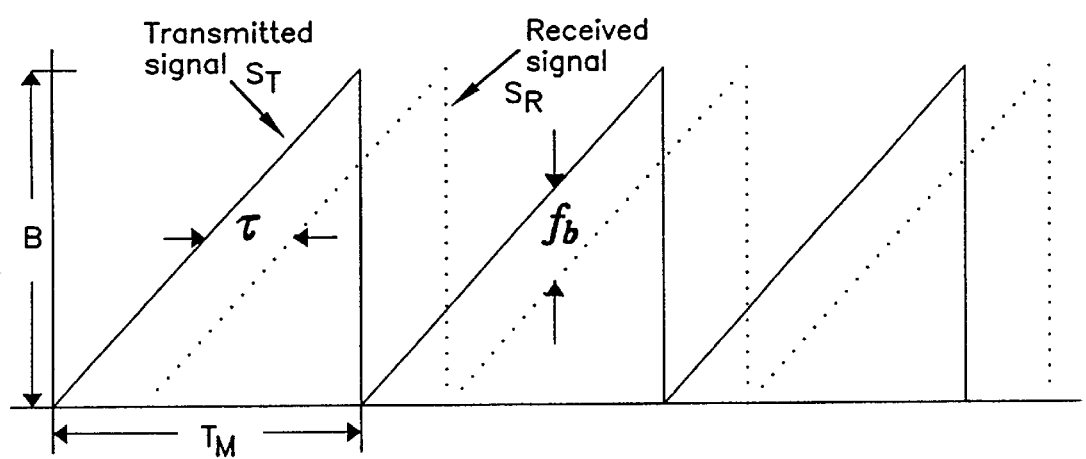
FIG. 1 is a diagrammatic representation of a transmit and receive signal associated with a point target detected by a frequency-modulated, continuous-wave radar.

The present invention is directed to a high-resolution radar-type probing apparatus and method particularly useful in short-range applications. A transmitter is employed to broadcast a frequency-modulated probe signal at each of a number of center frequency steps. A receiver receives a return signal from which magnitude and phase information corresponding to a target object are measured and stored in a memory at each of the center frequency steps. The range to the object is determined using the set of magnitude and phase information stored in the memory.

A radar system operating in accordance with the principles of the present invention (referred to herein as a swept-step, frequency-modulated radar or swept-step radar) advantageously exploits the ranging capability of a frequency-modulated, continuous-wave radar and the high-resolution attributes of a step-frequency radar. The range gating and frequency stepping technique in accordance with the principles of the present invention improves the sensitivity of short-range radars by eliminating deleterious antenna reflections which heretofore have significantly reduced the sensitivity of radars operating at short-ranges, such as between two to three meters, for example.

To better appreciate the advantages of the present invention, it is useful to review the operational characteristics of a conventional step-frequency radar and a typical frequency-modulated, continuous-wave radar. A step-frequency radar, in general terms, transmits a step-frequency signal, $V_t(f)$, such as that characterized by the following equation:

$$V_t(f) = E_o \quad [1]$$

where, $E_o$ represents the field strength of the transmit signal. When the step-frequency signal travels to a target located at a distance, d, from the radar and back, the total number of wavelengths traveled is given by:

$$N_\lambda = \frac{2d}{\lambda} \quad [2]$$

and the total angular excursion is given by:

$$2\pi N_\lambda = 2\beta d \quad [3]$$

where, $\beta$ represents the propagation constant ($2\pi/\lambda$). Assuming that the transmission media is lossless and homogeneous, the return signal for the case of a single point target is given by the following equation:

$$V_r(f) = E_o \Gamma \exp(j2\beta d) \quad [4]$$

where, $\Gamma$ represents the complex reflection coefficient of the target. The expression of Equation [4] represents the case for a single frequency.

When the frequency is increased in uniform steps for N number of times, Equation [4] may be expanded as follows:

$$V_r(f_n) = E_o \Gamma \exp j(2\beta_n d) \quad [5]$$

and $$\beta_n = \frac{2\pi f_n}{c} = \frac{2\pi(f_o + n\Delta f)}{c} \quad [6]$$

where, $f_o$ represents the start frequency, the frequency step size is represented by $\Delta f$, and n represents the frequency step number which is incremented between 0 to N–1. Expanding $V_r(f_n)$ in Equation [5], the following equation is given:

$$V_r(f_n) = E_o \Gamma \exp j\left(\frac{4\pi(f_o + n\Delta f)d}{c}\right) \quad [7]$$

From Equation [7], it can be seen that for a fixed distance, d, from the radar, the step-frequency signal, $V_r(f_n)$, will be sinusoidal with respect to n, with the period being determined by the parameter d. It is noted that this equation may be viewed as representing the time series data in the conventional sense. It is further noted that, with regard to the term step-frequency radar data as used herein, the frequency domain denotes the signal associated with $V_r(f_n)$, and the distance (range) or time domain is associated with the spectrum of $V_r(f_n)$.

The Fourier transform of the signal represented in Equation [7] with respect to n will produce the spectrum of the signal corresponding to the target and the distance, d, can then be determined. From the spectrum, the index location of the target, i, can be determined. The relationship between the distance, d, and the index location, i, is given by:

$$\frac{2\Delta f d}{c} = \frac{i}{N} \quad [8]$$

$$d = \frac{c}{2\Delta f} \times \frac{i}{N} \quad [9]$$

From Equations [8] and [9], two additional important parameters for the step-frequency radar may be defined, namely, the maximum range and the range resolution ($\Delta R$), as given by the following equations:

$$Max.Range = \frac{c}{2\Delta f} \quad [10]$$

$$\Delta R = \frac{c}{2\Delta f N} \quad [11]$$

It can be seen from Equation [10] that the maximum range for a step-frequency radar is dependent on its frequency step size (i.e., the smaller the step size, the greater the maximum range). From Equation [11], it can be seen that for the same frequency step size, a higher resolution may be obtained by increasing the sweep bandwidth, which may be accomplished by increasing the number of frequency steps. As will be described in detail hereinbelow, the swept-step radar of the present invention provides for extended range determinations beyond the maximum range defined for a step-frequency radar having equivalent operational characteristics, yet maintains the same resolution.

Typically, more than one scatterer will be present in a given volume subjected to radar probing. For purposes of example, it is assumed that there are K number of scatterers. Using Equation [7] above, it follows that:

$$V_r(f_n) = \sum_{k=0}^{K-1} E_{ok} \Gamma_k \exp j\left(\frac{4\pi(f_o + n\Delta f)d_k}{c}\right) \quad [12]$$

From Equation [12], it can be seen that for each frequency, $f_n$, there are K number of sinusoids with differing periods, assuming that no two scatterers are located within the same range resolution, $\Delta R$. In order to resolve all of the scatterers, a constraint must be imposed that only N number of scatterers are present. Hence, the maximum value for K is N. The fast Fourier transform (FFT) of $V_r(f_n)$ with respect to n provides the spectral distribution of all the scatterers with their associated amplitude and phase values as given by the following equations:

$$Amplitude = E_{ok}|\Gamma_k| \quad [13]$$

$$Phase = \frac{4\pi f_o d_k}{c} + \arg(\Gamma_k) \quad [14]$$

The complex reflection coefficient of a target can be determined by calibrating the return signal with a target of known reflection coefficient. The complex reflection coefficient as a function of frequency for a target can be obtained by centering a bandpass filter over the target of interest and taking the inverse fast Fourier transform (IFFT) of the gated signal.

Having discussed the general operational characteristics of a typical step-frequency radar, a brief description of the operational characteristics of a frequency-modulated, continuous-wave radar will now be provided, with reference being made to FIG. 1. In general, a frequency-modulated, continuous-wave radar frequency modulates a signal, $S_T$, over some bandwidth. The bandwidth of the transmit or probe signal, $S_T$, determines the range resolution. The larger the bandwidth of the probe signal, $S_T$, the higher the range resolution. The return signal, $S_R$, from a target is compared to the transmitted probe signal, $S_T$, to extract the range, amplitude, and phase information associated with the target. The difference between the return signal, $S_R$, and the probe signal, $S_T$, is referred to as the intermediate frequency (IF) signal or beat signal.

FIG. 1 is an illustration of a typical transmit and receive waveform associated with a point target for a typical frequency-modulated, continuous-wave radar. The amount of time, $\tau$, required for the signal to travel the two-way distance between the target and the radar, commonly referred to as flight time, is given by the following equation:

$$\tau = \frac{2R}{c} \quad [15]$$

Based on the geometry of the transmit and receive waveforms, $S_T$ and $S_R$, illustrated in FIG. 1, a relationship may be derived between the beat frequency, $f_b$, and the range, R. The beat frequency, $f_b$, represents the instantaneous difference frequency between the transmitted and received signals, $S_T$ and $S_R$, respectively. For the sawtooth modulated waveform depicted in FIG. 1, the following relationship is given:

$$\frac{\tau}{T_m} = \frac{f_b}{B} \quad [16]$$

Substituting for $\tau$ of Equation [15] into Equation [16], the following equation results:

$$f_b = \frac{2RBf_m}{c} \quad [17]$$

where, R represents the range to the target, B represents the FM sweep bandwidth, $f_m$ represents the modulation frequency of the sawtooth waveform, c represents the speed of light, and $f_b$ represents the beat frequency.

For multiple targets, the beat signal will consist of several frequencies. The Fourier transform of the beat signal provides the spectral components of each of these targets. The minimum two-way travel time, $\tau_{min}$, for the signal is given by:

$$\tau_{min} = \frac{1}{B} \quad [18]$$

Substituting Equation [18] into Equation [15], it can be seen that the range resolution, $\Delta R$, for the frequency-modulated, continuous-wave radar is given as:

$$\Delta R = \frac{c}{2B} \quad [19]$$

From Equation [19], it can be observed that the range resolution, $\Delta R$, is dependent on the sweep bandwidth.

It is generally understood that frequency-modulated, continuous-wave radars provide for broad-band measurements which, in turn, provide for high-resolution probing. This understanding is verified by Fourier transform theory, which defines the inverse relationship between the frequency domain and time domain: the wider the sweep bandwidth, the higher the time resolution, hence the better resolving capabilities. The target resolving capabilities of currently available frequency-modulated, continuous-wave radars, as with any conventional short-range single-antenna radar system, however, are negatively impacted by a number of limitations.

By way of example, typical frequency-modulated, continuous-wave radars produce many interference and leakage signals that are usually much higher in strength than the return signal, $S_R$, received from a target. Antenna reflection, for example, is a primary source of interference that severely limits the sensitivity of conventional frequency-modulated, continuous-wave radar systems when used in short-range applications. Also, undesirable reflections from impedance mismatches between RF components contribute to an overall reduction in target detection sensitivity and resolution. Additionally, there exists the problem of limited isolation when the oscillator signal leaks into the receive path. These undesirable operational characteristics severely limit the sensitivity and resolution capabilities of conventional frequency-modulated, continuous-wave radars when utilized in short- range probing applications.

The radar probing apparatus and technique of the present invention overcomes the deficiencies identified hereinabove and other known limitations associated with conventional short-range radar probing approaches, yet exploits the advantageous attributes of step-frequency and frequency-modulated, continuous-wave radar systems. A radar system operating in accordance with the principles of the present invention provides for high-resolution target detection comparable to that provided by a step-frequency radar and a ranging capability equivalent to that of a frequency-modulated, continuous-wave radar.

Figure 2:
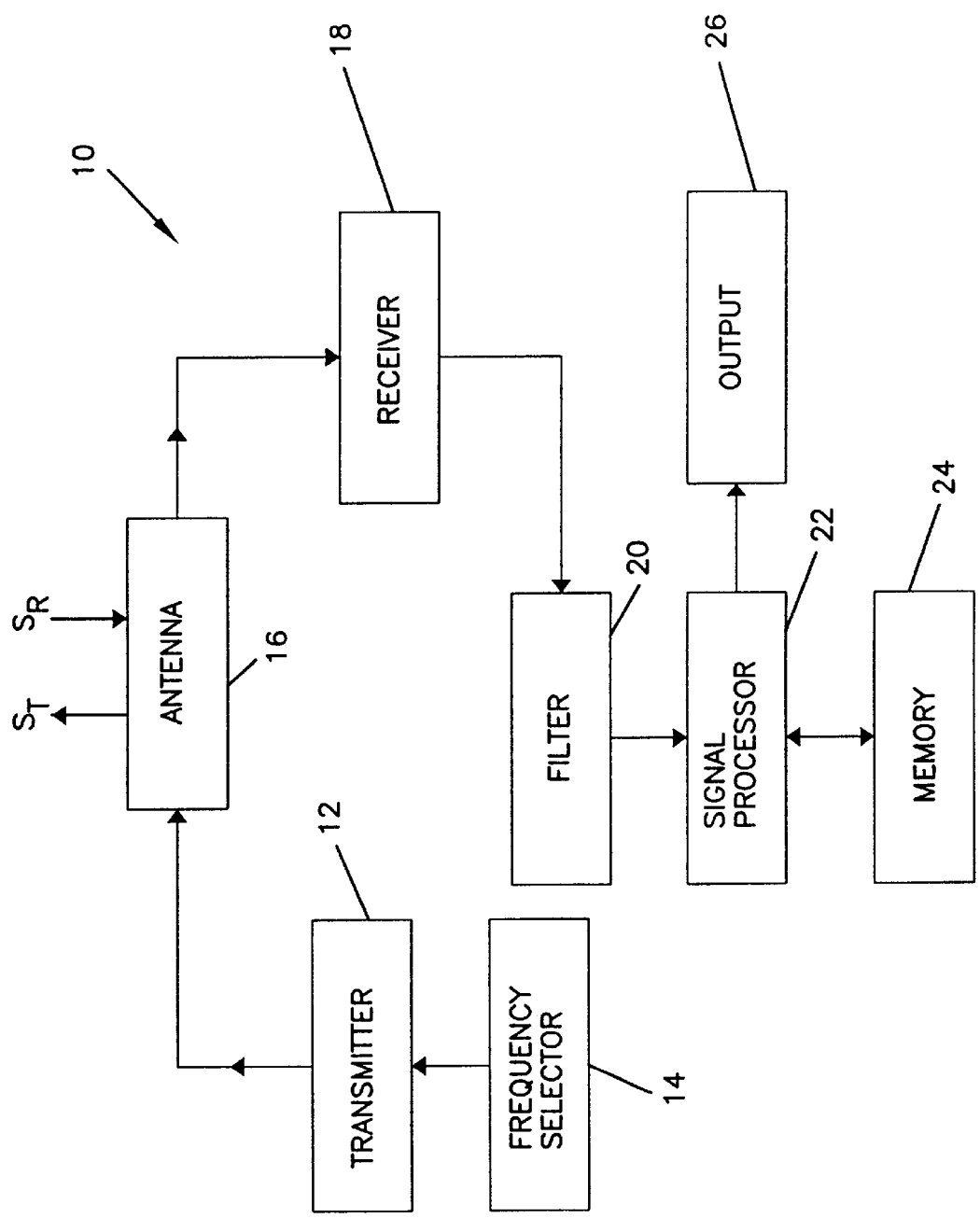
FIG. 2 is a block diagram illustrating a radar system in accordance with the principles of the present invention.

Turning now to FIG. 2, there is illustrated in system block diagram form a depiction of a radar apparatus 10 in accordance with one embodiment of the present invention that provides for a high-resolution range-gated spectrum of a target object. A frequency selector 14 is coupled to a transmitter 12 that cooperatively operate to generate a frequency-modulated probe signal, $S_T$, having a center frequency, $f_c$. The probe signal, $S_T$, is transmitted in a preferred direction, which may be in an above-ground or underground direction, using an antenna 16. A return signal, $S_R$, is received by the antenna 16 and communicated to a receiver 18. It is note that the antenna 16 may be used in a monostatic mode or a bistatic mode, in which case a separate transmit antenna and receive antenna are respectively coupled to the transmitter 12 and the receiver 18.

The return signal, $S_R$, is communicated from the receiver 18 to a filter 20. The filter 20 is configured to suppress undesirable antenna reflection and, in one embodiment, is configured as a high-pass filter having a cut-off frequency selected to eliminate antenna reflection. The filtered return signal is then processed by a signal processor 22, such as a digital signal processor, to determine the magnitude and phase of the return signal, $S_R$, This information is stored in a memory 24 coupled to the signal processor 22.

The frequency selector 14 then shifts the center frequency, $f_c$, of the probe signal, $S_T$, by a predetermined frequency interval or step. The probe signal, $S_T$, having a shifted center frequency, $f_c$, is then transmitted by the antenna 16. The return signal, $S_R$, resulting from the probe signal, $S_T$, having a shifted center frequency, $f_c$, is received by the antenna 16 and communicated to the receiver 18, filter 20, and signal processor 22 in the above-described manner. The magnitude and phase information of the return signal, $S_R$, is stored in the memory 24. The frequency selector then selects other probe signal center frequencies, $f_c$, and the above-described process is repeated at each of the center frequency steps. After processing the return signals resulting from the transmission of a probe signal produced at each center frequency step, the signal processor 22 computes the range, R, of one or more target objects associated with the return signals.

Figure 3:
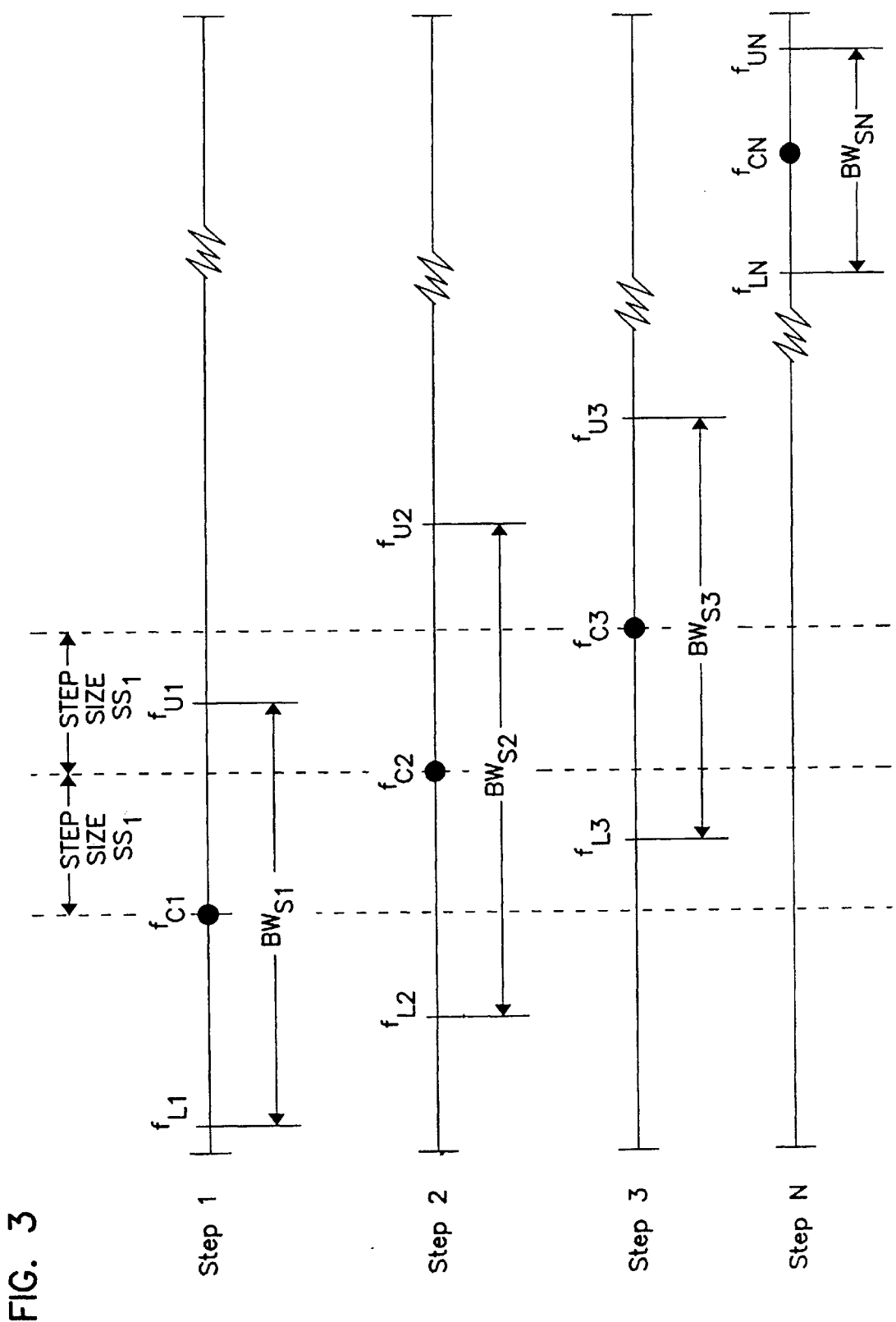
FIG. 3 is a showing of center frequency shifting in accordance with a swept-step radar technique of the present invention.

FIG. 3 illustrates various characteristics of the probe signals produced by a swept-step radar in accordance with the principles of the present invention. By way of example, and not of limitation, a first frequency-modulated probe signal is generated at a first interval, Step 1, having a center frequency, $f_{C1}$, and an associated sweep bandwidth, $BW_{S1}$, defined by a lower frequency limit, $f_{L1}$, and an upper frequency limit, $f_{U1}$. The probe signal at Step 1 is then transmitted and a resulting return signal is processed in the above-described manner. A second probe signal is then generated at Step 2. The second probe signal has a center frequency, $f_{C2}$, that is shifted with respect to the center frequency, $f_{C1}$, of the first probe signal. The second probe signal has associated with it a sweep bandwidth, $BW_{S2}$, defined by lower and upper limit frequencies $f_{L2}$ and $f_{u2}$, respectively.

Figure 4:
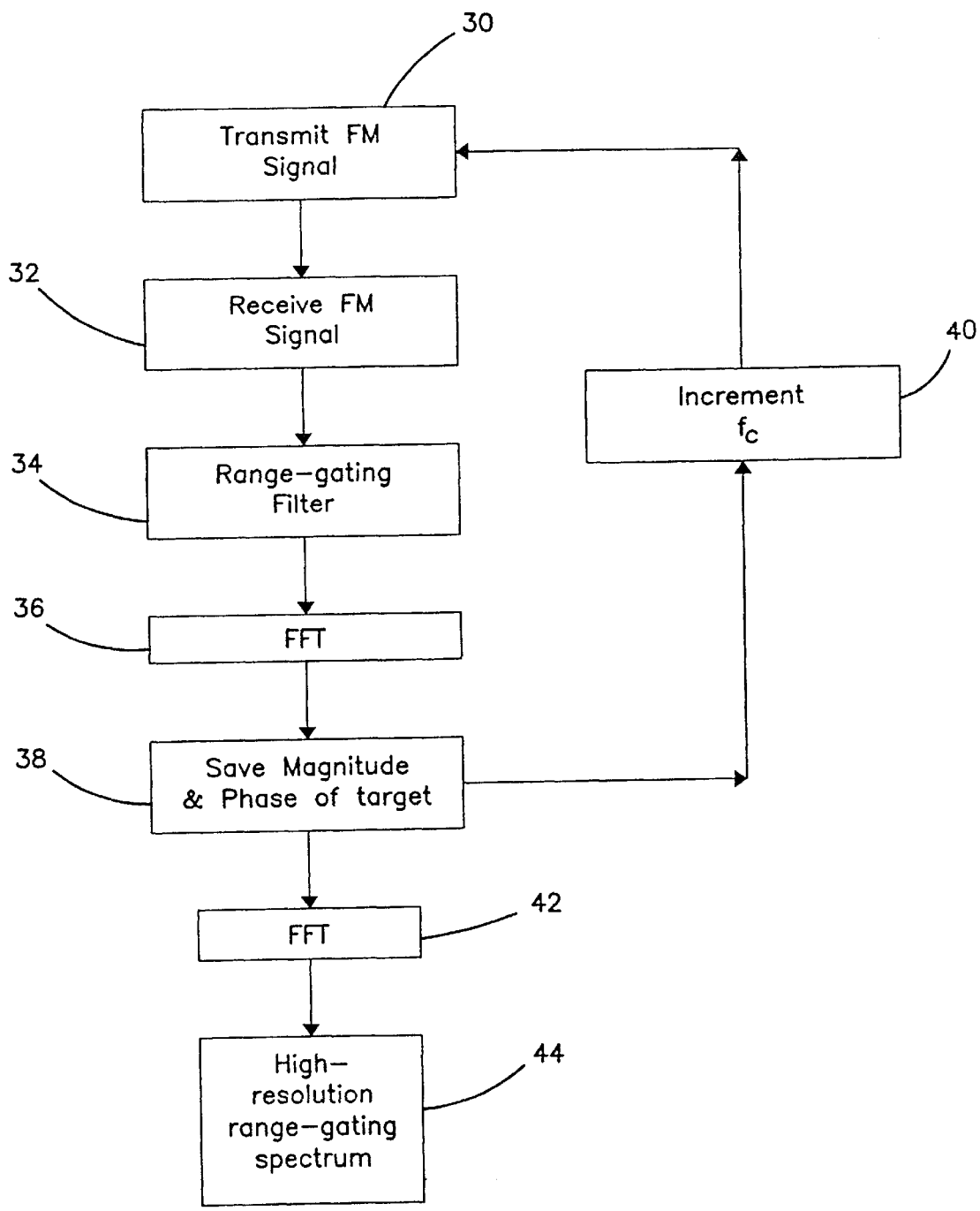
FIG. 4 illustrates in flow diagram form a swept-step radar detection methodology in accordance with the principles of the present invention.

Referring to FIG. 4, a general methodology for obtaining a high-resolution range-gated spectrum of a target in accordance with then principles of the present invention is depicted in flow diagram form. At step 30, a frequency-modulated probe signal is generated and transmitted in a desired direction. A frequency-modulated return signal resulting from the probe signal is received at step 32. Range-gate filtering is applied to the return signal at step 34 so as to eliminate undesirable antenna reflection which typically afflict conventional short-range radars. The filtered return signal is then subjected to Fourier transformation, at step 36, which provides the magnitude and phase response of any scatterers or target objects. These data are stored at step 38.

The center frequency, $f_C$, of the probe signal is then incremented or, alternatively, decremented at step 40. The probe signal having a shifted center frequency, $f_C$, is then transmitted, and the process defined by steps 30 through 40 is repeated. At steps 42 and 44, the set of stored magnitude and phase data of all scatterers or target objects is subjected to Fourier transformation to produce a high-resolution spectral response of one or more target objects. The range to a target object may then be computed from this data, as will be described below.

For purpose of explanation, and not of limitation, it is assumed that an FM signal, as is defined in Equation [20] below, is transmitted by the swept-step radar at step 30 in FIG. 4:

$$v_t(t)=A\cos(2\pi f_c t+\pi Bf_m t^2+\theta_0) \quad [20]$$

where, $f_c$ represents the center frequency, the other variables being previously defined hereinabove. The received or return signal at the mixer of the receiver output, as will later be described in detail, is given by:

$$v_r(t)=\sum_i |\Gamma_i|A\cos(2\pi f_{bi}t + 2\pi f_c\tau_i + \pi f_{bi}\tau_i + \phi_i) \quad [21]$$

where, $|\Gamma_i|$ represents the magnitude of the reflection coefficient of the target at a location i, and $\phi$, represents the phase of $|_i$.

From Equation [21], it can be observed that at each time, t, the beat signal, $v_r(t)$, contains a summation of the scattering response from all scatterers. Taking the fast Fourier transform of the beat signal, $v_r(t)$, provides the magnitude and phase response of the scatterers at each beat frequency. It has been determined that using a high-pass filter with a cutoff frequency slightly higher than that for the antenna placed at the output of the mixer 77 shown in FIG. 8 suppresses any deleterious antenna reflection.

The fast Fourier transform of $v_r(t)$ is given by:

$$V_{fb}(f_h)=|\Gamma_{fb}|\exp(j\psi_{fb}) \quad [22]$$

where, $|\Gamma_{fb}|$ represents the magnitude of the reflection coefficient of the target corresponding to the beat frequency, $f_b$, and:

$$\psi_{fb} = 2\pi f_c \tau_{fb} + \phi_{fb} \qquad [23]$$

where, $\tau_{fb}$ represents the two-way flight time to the scatterer and back, and $\phi_{fb}$ represents the phase of $\Gamma_{fb}$.

At the beat frequency, $f_b$, corresponding to the target, the spectrum will contain the amplitude and phase information of the target corresponding to the center frequency, $f_c$. For each step of the center frequency, $f_c$, the amplitude and phase information of the target is stored. A set of step-frequency radar data is thus produced and is given by the following equation:

$$H(i) = |\Gamma_{tar}| \exp\{j(2\pi f_i \tau_{tar} + \phi_{tar})\} \qquad [24]$$

where, $f_i = f_o + i\Delta f$, and $\Delta f$ represents the frequency step size. By expanding Equation [24], the following equation results:

$$H(i) = |\Gamma_{tar}| \exp\{j(2\pi f_o \tau_{tar} + 2\pi \Delta f \tau_{tar} i + \phi_{tar})\} \qquad [25]$$

Taking the fast Fourier transform of H(i) with respect to i provides the high-resolution spectral response of the target.

The range, R, to the target may be computed in the following manner. The time resolution ($\Delta t$) associated with a step-frequency probing technique is given by:

$$\Delta t = \frac{1}{N\Delta f} \qquad [26]$$

where, N represents the number of frequency steps. Substituting $\Delta t$ for t and $\Delta R$ for R in Equation [15] provided hereinabove, the relationship between the range resolution and time resolution is given by:

$$\Delta R = \frac{\Delta t \times c}{2} \qquad [27]$$

It can be seen that the index location of the target, i, is equal to $\Delta f \tau_{tar}$, which varies from 0 to N−1, where N represents the number of frequency steps. Thus, the range, R, to the target may be computed as:

$$R = \Delta R \Delta f \tau_{tar} \qquad [28]$$

Referring now to FIGS. 5–8, there is illustrated an embodiment of a swept-step radar apparatus that operates in accordance with the radar probing methodology depicted in FIG. 4 and the principles represented in mathematical terms in Equations [20] through [28]. The swept-step radar 50 includes a waveform generator 54 and an FM driver 56 coupled to the waveform generator 54. The RF section 58 of the swept-step radar 50 includes a YIG oscillator 60 coupled to both the FM driver 56 and a 6-dB coupler 62, a dual directional coupler 64 coupled to the 6-dB coupler 62, a phase trimmer (not shown), a dual mixer 77, and a coaxial switch 70 that selectively couples a single antenna 66 or a dual antenna apparatus 66/68 to an input of the dual mixer 77.

An IF section includes two IF amplifiers 76 and 78 which are respectively coupled to first and second mixers 72 and 75 of the dual mixer 77. The first and second IF amplifiers 76 and 78 are respectively coupled to an incident channel 80 and a reflected channel 82. As will later be described in detail, a highpass filter 74 is placed in the reflected channel 82 between the second IF amplifier 78 and the second mixer 75 of the dual mixer 77 to effectively eliminate undesirable antenna reflection.

The waveform generator 54, in accordance with one embodiment of the present invention, produces a sawtooth waveform, such as that illustrated in FIG. 1. A MAX038 High-Frequency Waveform Generator, manufactured by Maxim Integrated Products, produces a sawtooth waveform of a type suitable for use in this embodiment of the present invention. The MAX038 waveform generator is a high-frequency function generator capable of producing accurate triangle, sine, and square waveforms by configuring the appropriate jumper settings. The sawtooth waveform may be generated by changing the duty cycle of the triangular waveform. The MAX038 waveform generator, as assembled in the factory, generates waveforms from 325 kHz to 10 MHz.

The frequency range for the generated waveform may be set by selecting the appropriate capacitor (C1) value from the table provided on page 4 of the MAX038 1994 data sheet. The frequency of the generated waveform may then be set by adjusting the potentiometers, IIN or FADJ. The modulation frequency was chosen based on the range of operation. In accordance with this embodiment, a 1-kHz modulation was selected to enable operation at ranges up to 29 m with a maximum beat frequency of 25 kHz and a sweep bandwidth of 130 MHz (see Equation [17] above).

The center frequency, $f_C$, of the YIG oscillator 60 may be deviated as much as +/−70 MHz by pumping current into the FM coil of the YIG oscillator. The sensitivity of the FM coil is given as 450 kHz/mA. Theoretically, in order to achieve a sweep bandwidth of 140 MHz, as much as +/−155.6 mA of current must flow into the FM coil. This amount of current is well within the maximum current rating threshold of +/−200 mA specified by the manufacturer.

The FM driver 56 was initially designed to produce a current of +/−155.6 mA. However, upon testing the FM driver 56 with the spectrum analyzer, it was found that this amount of current produced center frequency deviations of only +/−55 MHz. The current flow into the FM coil was then increased to +/−190 mA to deviate the center frequency of the YIG oscillator 60 by +/−65 MHz. Hence, a range resolution of 1.15 m is obtained for a sweep bandwidth of 130 MHz.

Figure 7:
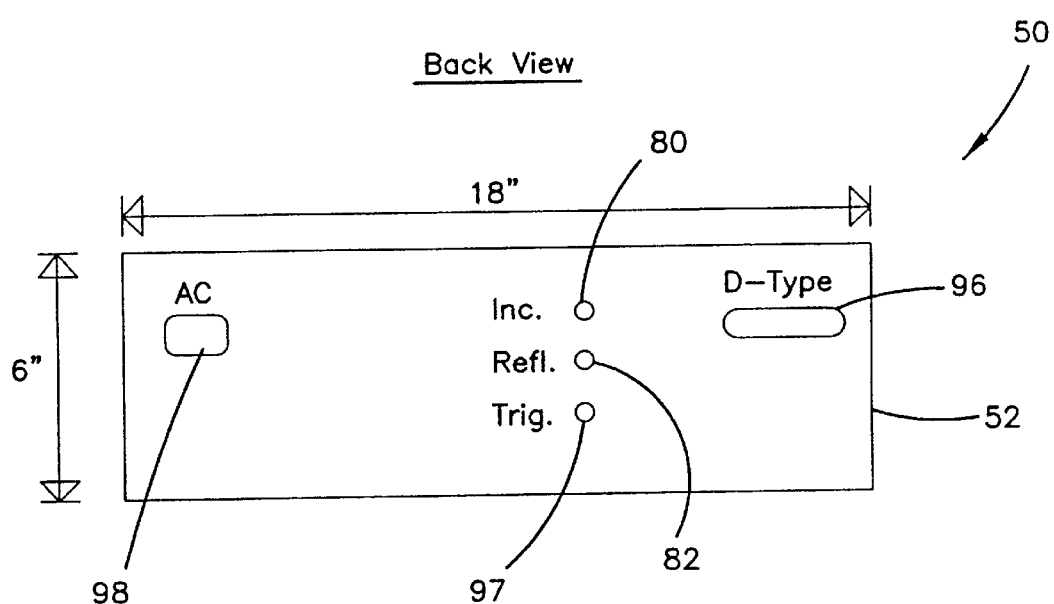
FIG. 7 is a rear plan view of the swept-step radar system housing shown in FIG. 5.
Figure 8:
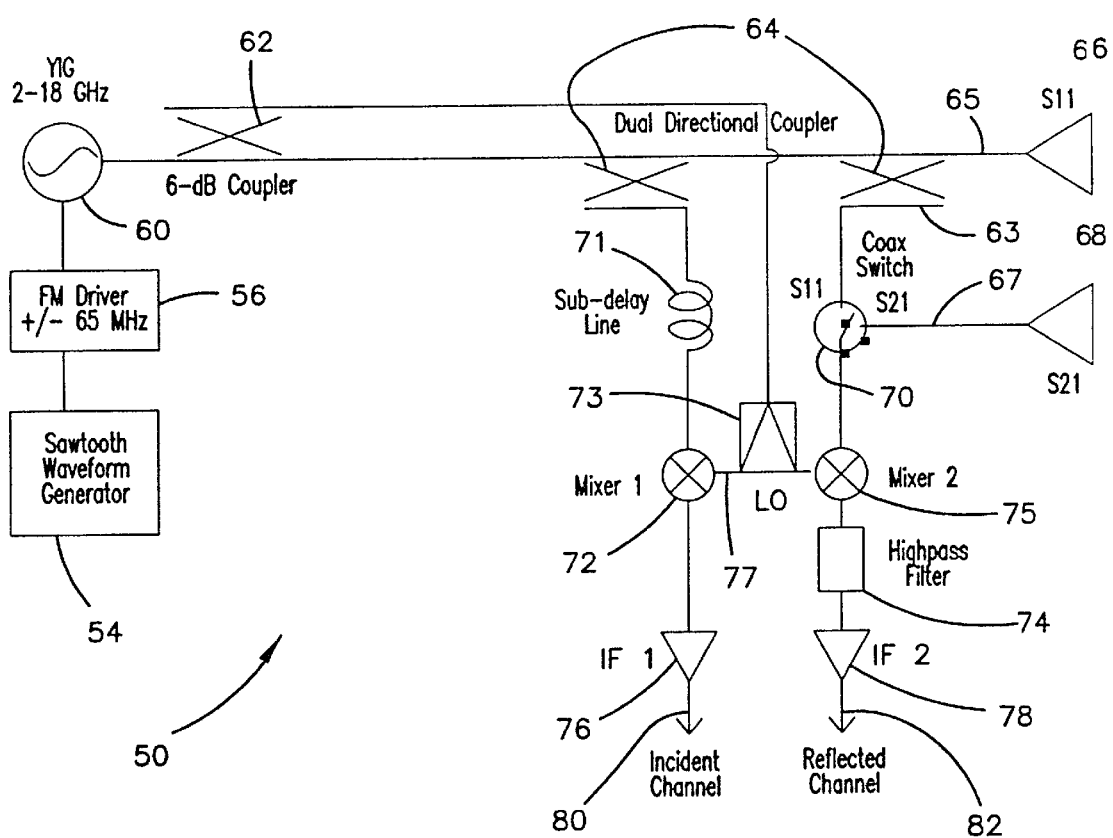
FIG. 8 is an illustration of various components and interconnections of a swept-step radar system in accordance with an embodiment of the present invention.
Figure 9:
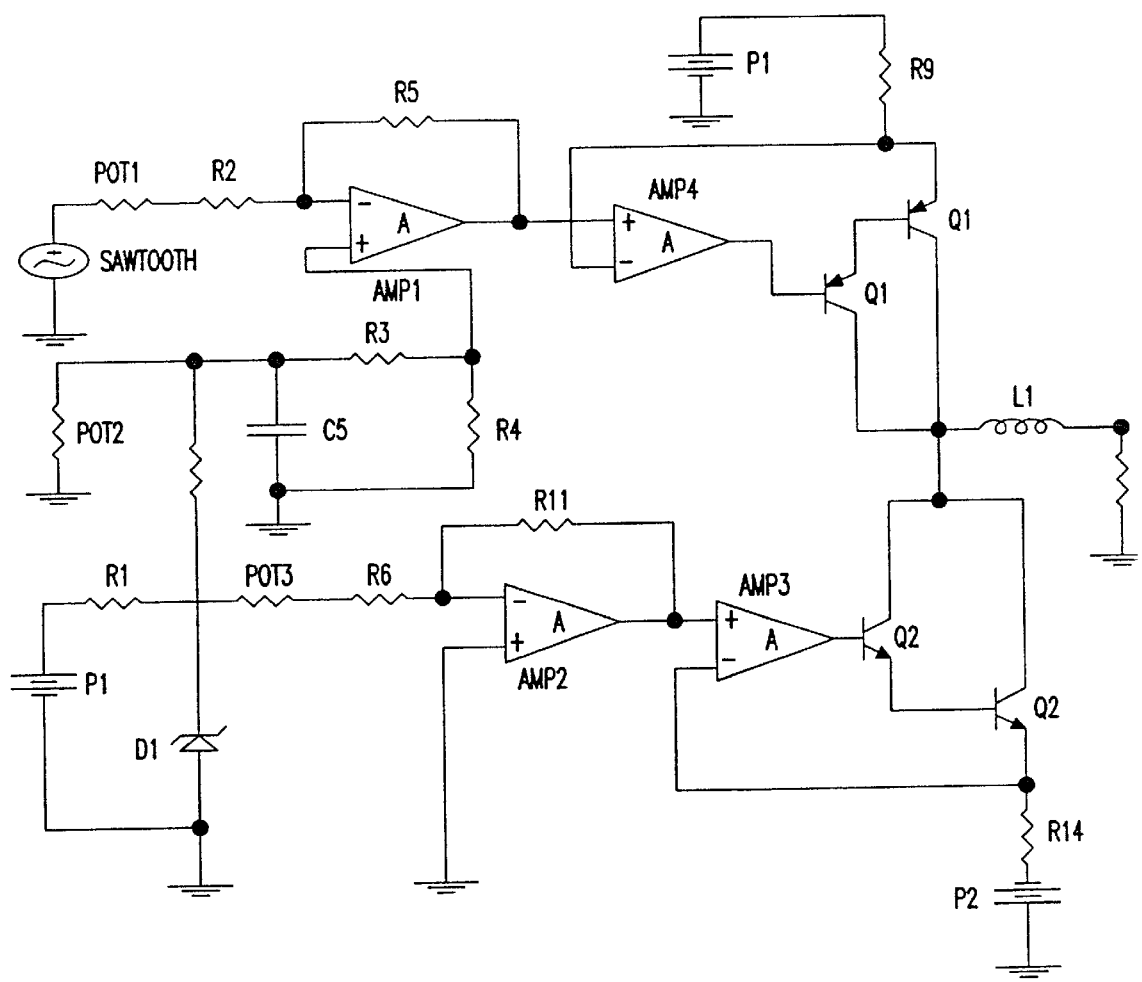
FIG. 9 is a schematic illustration of one embodiment of the frequency-modulated (FM) driver shown in FIG. 8.

The schematic diagram of FIG. 9 is a depiction of an exemplary FM driver 56 for use in the embodiment of the swept-step radar 50 illustrated in FIGS. 5–8. In the diagram of FIG. 9, resistor $R_1$ and inductor $L_1$ represent the input impedance of the FM port coupled to the YIG oscillator 60. Transistors $Q_1$ are configured as a PNP Darlington transistor pair that supplies current from 0 to 380 mA to the FM port. The $Q_1$ Darlington transistor pair is designed to supply 380 mA of current in response to an input voltage of +2 V, and 0 mA of current in response to an input voltage of −2 V. This is accomplished by selecting appropriate values for resistors $R_2$ and $R_5$ of the difference amplifier $AMP_1$. The variable resistor, $POT_1$, is used to fine tune the current range to be 380 mA. As such, the bandwidth of the FM sweep of the YIG oscillator 60 may be adjusted using $POT_1$.

Amplifier $AMP_4$ acts as a buffer that drives the $Q_1$ Darlington transistor pair. The voltage appearing at the positive terminal of $AMP_1$ may be adjusted using the variable resistor $POT_2$ in order to accurately control the current within the range of 0 to 380 mA. Hence, $POT_2$ operates as an FM bandwidth offset adjuster. Diode $D_1$ is a 10 V zener diode that provides a stable +10 V supply. This voltage is used as a reference voltage for $POT_2$ to set the offset voltage at the positive terminal of $AMP_1$, and is also used as the input voltage to AMP$_2$ for setting the reference voltage at resistor R$_{14}$.

Transistors Q$_2$ are configured as an NPN Darlington transistor pair that pulls a constant +190 mA current out of the FM port. This effectively supplies +/−190 mA to the FM port. To achieve this, the voltage across the 22 ohm resistor R$_{14}$ is designed to be about 4.2 V. This voltage drop across resistor R$_{14}$ will result in 190 mA of current in the emitter of the Q$_2$ transistor pair. Since the common-emitter current gain for the Darlington configuration is very large (e.g., β=2,500), the current in the collector of Q$_2$ can also be assumed to be about 190 mA. Because of the large wattage generated across resistors R$_9$ and R$_{14}$, which is about 1W, 3W rated resistors are suitable for withstanding this high wattage.

The op-amp AMP$_2$ is an inverting amplifier that provides the reference voltage across the resistor R$_{14}$. The values of the resistors R$_6$ and R$_{11}$ are selected to obtain the required voltage at R$_{14}$, and POT$_3$ is a variable resistor that can be used to fine tune the reference voltage at R$_{14}$. Operational amplifier AMP$_3$ is a buffer amplifier that drives the base of the Q$_2$ Darlington transistor pair. The values for the components shown in FIG. 9 are provided in tabular form in FIG. 10.

Figure 11:
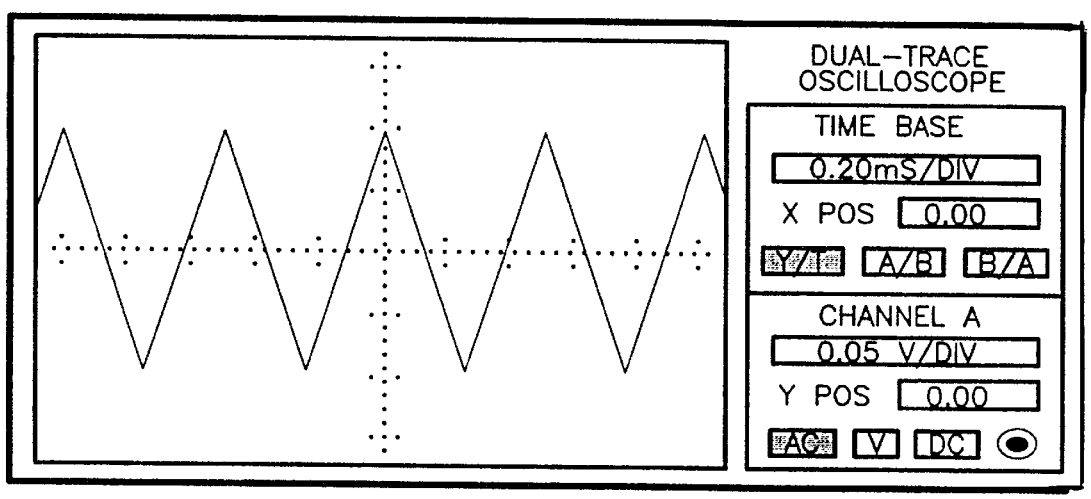
FIGS. 11 and 12 illustrate an input waveform and an output waveform respectively processed by the FM driver shown in FIG. 9.
Figure 12:
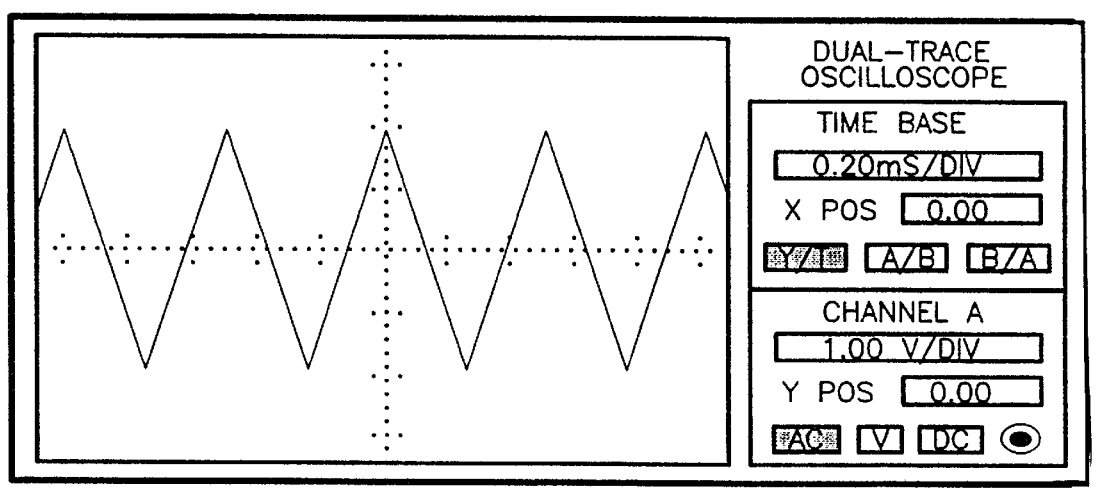

The circuit illustrate in FIG. 9 was simulated using the computer program known as Electronics Workbench to verify the operation of the FM driver 56. The results of the simulation are shown in FIGS. 11 and 12. FIG. 11 is a showing of the input triangle waveform, which varies between −0.1 V and +0.1 V . FIG. 12 is a showing of the output at the FM port, which varies between −2 V and +2 V. This voltage variation corresponds to an effective current ranging between −200 mA and +200 mA across a 0.5 ohm resistor.

Returning now to FIGS. 5–9, the RF section of the swept-step radar 50 operates in the 2 to 18 GHz frequency range. The RF section is responsible for transmitting and receiving the range-gated FM signal. A digital-tuned YIG oscillator 60 is employed as the signal source for the RF section. The center frequency, f$_c$, is stepped by sending control bits from a processor, such as an on-board processor or a personal computer, to the digital driver of the oscillator 60 via a CIODIO-24 control board, for example. In this configuration, there are 12 control bits used to determine the center frequency, f$_c$, with 0$_h$ and FFF$_h$, represented in hexadecimal form, corresponding to 2 and 18 GHz, respectively. Each control bit corresponds to a frequency resolution as determined by the following Equation:

$$\Delta f = \frac{(18-2)\,\text{GHz}}{(FFF_h - 0)} \quad [29]$$
$$= \frac{16\,\text{GHz}}{4095}$$
$$= 3.9072\,\text{MHz}$$

It is understood that the operational frequency range of the swept-step radar, as well as the frequency step size, number of steps, and other parameters, may be varied as needed depending on the requirements of a particular application. Table 1 below provides values for the various operational parameters of the swept-step radar in accordance with one embodiment of the present invention. The values presented in Table 1 are provided for purposes of explanation and not of limitation.

TABLE 1

| PARAMETER | VALUE |
|---|---|
| Center Frequency | 2.37–17.65 GHz |
| Center Frequency Step Size | 11.7 MHz |
| Number of Frequency Steps | 1300 |
| RF Bandwidth | 130 MHz |
| Range Resolution | 1.15 m |
| Max. IF Frequency | 25 kHz |
| Sampling Frequency | 50 kHz |
| Max. Unambiguous Range | 29 m |
| Number of Sweeps Averaged | 1 |
| Number of Samples per Sweep | 50 samples |

To determine the accuracy of the given frequency resolution, tests were performed on the YIG oscillator 60 using a spectrum analyzer. The spectrum analyzer was controlled by a PC via an HPIB board, and the YIG oscillator 60 was stepped through the entire 4096 frequencies. At each frequency, the output power from the test port 86 of the dual-directional coupler 64, shown in FIG. 5, and the actual frequency of the YIG oscillator 60 were recorded. The graphs in FIGS. 13–16 show the actual frequency step size of the oscillator 60 and the deviation of the frequencies from their straight-line fit after one hour of oscillator operation.

Figure 13:
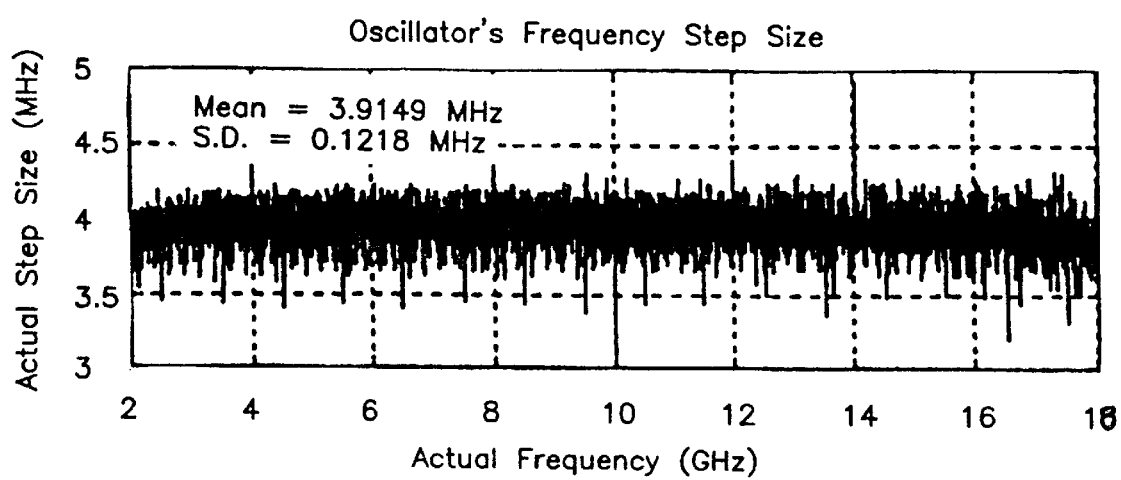
FIGS. 13–16 illustrate various performance characteristics of the oscillator shown in FIG. 8 upon start-up and after one hour of operation.
Figure 14:
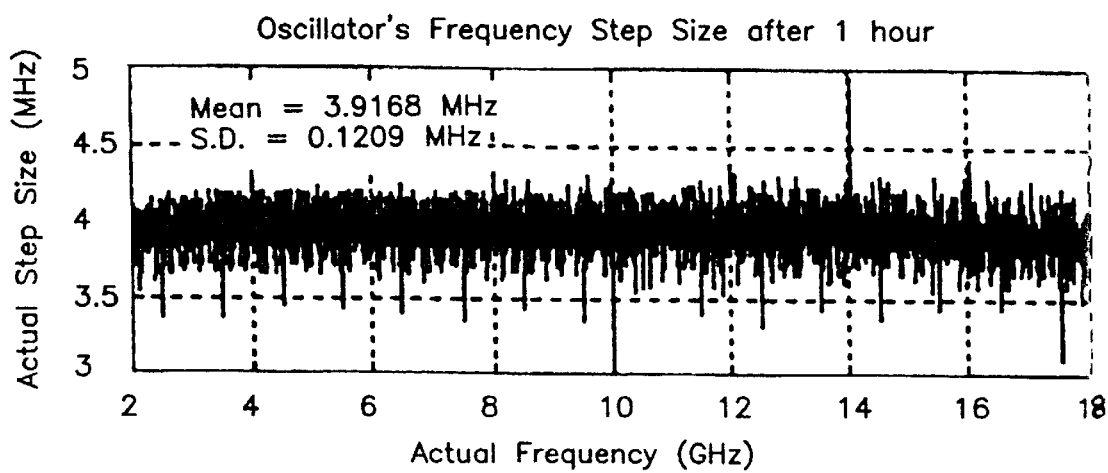
Figure 15:
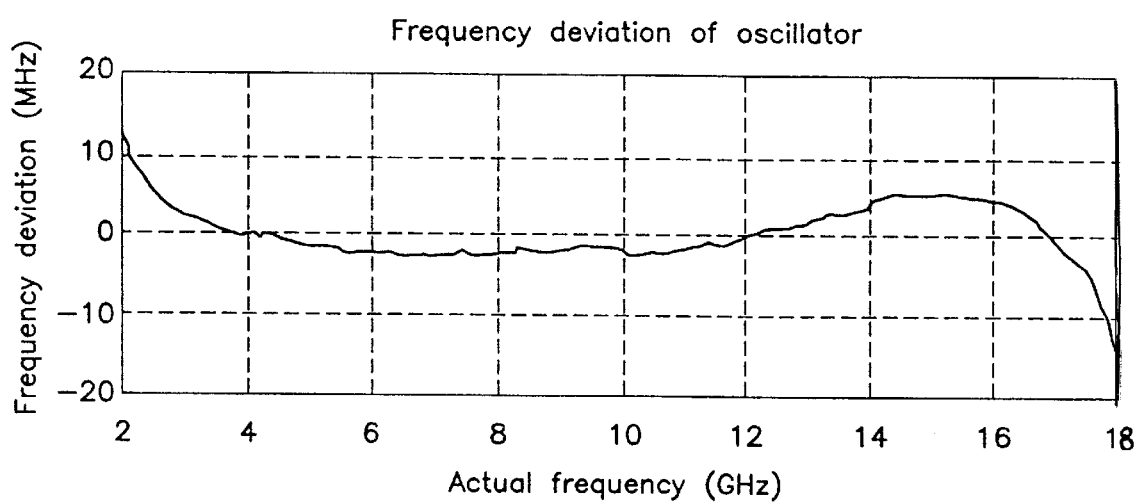
Figure 16:
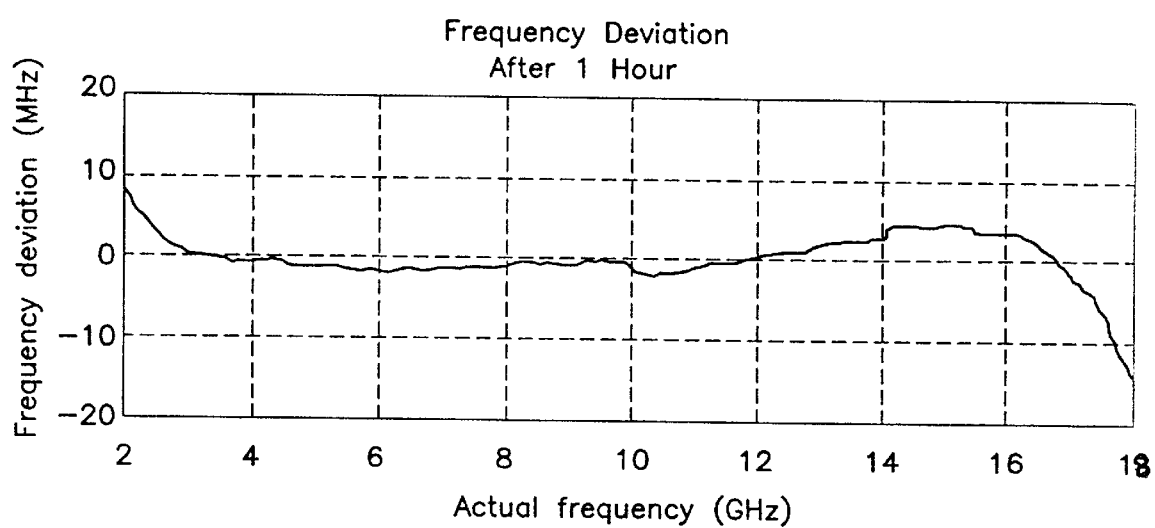

Ideally, the plot in FIGS. 13 and 14 should have zero standard deviation, but a standard deviation on the order of 0.12 MHz is observed. The standard deviation exhibited a slight drop with an increase in time. It can be observed from FIGS. 15 and 16 that the deviation at the edges of the frequency span is fairly high and decreases as a function of time. This indicates that the temperature of the oscillator 60 needs to stabilize in order to obtain optimum performance. As will later be discussed, results from computer simulations demonstrate that the oscillator 60 should be operated in the linear region in order to avoid aliasing of the signal. It is therefore desirable to operate the swept-step radar between 2.37 GHz and 17.65 GHz, rather than between 2 and 18 GHz in accordance with this embodiment of the present invention. It is reiterated that the frequency range of swept-step radar operation may vary from that described herein depending on a given application. By way of example, frequencies below 2 GHz may define the lower bound of the operational frequency range, while the upper bound may exceed 18 GHz.

The 6-dB directional coupler 62, shown in FIG. 8, supplies one-fourth of the output power from the YIG oscillator 60 to the local oscillator (LO) port 73 of the dual mixer 77 for down converting the RF signal from the incident and reflected channels 80 and 82, respectively. The remaining power is coupled to the input port 84 of the dual-directional coupler 64. A suitable dual-directional coupler is model HP 772D manufactured by Hewlett-Packard. The input signal applied to the input port 84 of the dual-directional coupler 64 is derived from the 6-dB coupler. A fraction of this signal (e.g., −20 dB) is coupled to the test port 86 for measurement, and the remaining signal content is coupled to the incident port 80.

The signal from the incident channel 80 is used as a calibration signal to remove system effects. This is achieved by matching the phase of the signals from the incident channel 80 and reflected channel 82 by introducing a sub-delay line 71 between the incident channel 80 and the RF input of the dual mixer 77. The length of the sub-delay line 71 is chosen to ensure that the returns from the incident channel 80 and the reflected channel 82 arrive at the input terminals of the dual mixer 77 substantially at the same time.

A phase trimmer (not shown) is introduced between the sub-delay line 71 and the dual mixer 77 to provide for fine tuning when matching the phase of the returns from the incident and reflected channels 80 and 82, respectively.

The dual mixer 77, as previously mentioned, is used to down convert the RF signal to an IF signal on both the incident and reflected channels 80 and 82. The output from the YIG oscillator 60 is used as the local oscillator (LO) to down convert the RF signal. The YIG oscillator's minimum output power is 15 dBm, and one-fourth of 15 dBm is 9 dBm. Hence, for a local oscillator power of 9 dBm, the conversion loss for the dual mixer 77 is 6.5 dBm. A coaxial switch 70 is used to selectively perform either single antenna ($S_{11}$) 66 or dual antenna ($S_{21}$) 66/68 radar measurements. The coaxial switch 70 is driven by a −15 V source to provide for switching between the $S_{11}$ and $S_{21}$ modes of operation.

Figure 17:
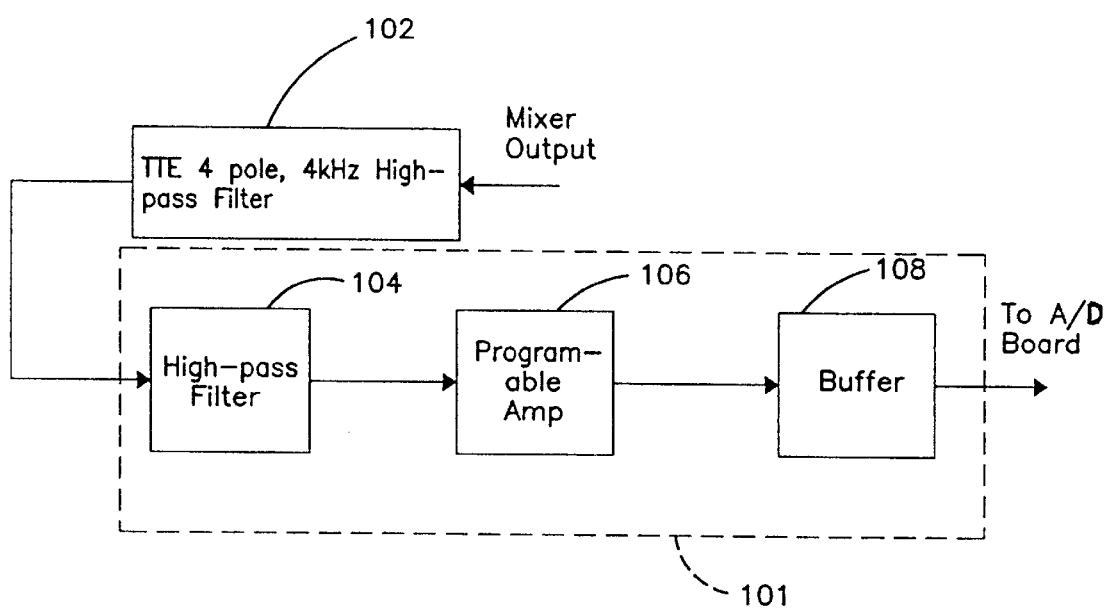
FIG. 17 is a block diagram of the IF section of a swept-step radar system in accordance with an embodiment of the present invention.

Turning now to FIG. 17, there is illustrated in block diagram form an embodiment of the IF section of a swept-step radar. The IF section is responsible for amplifying the down-converted RF signal coming from the dual mixer 77. The IF section includes a 4-kHz high-pass filter 102 and an IF amplifier 101. The RF signal, which has been down-converted by the mixer 77, is fed to the high-pass filter 102 to cut off leakage signals and reflection from the test port 86 and the antenna 66 and/or 68. The output of the high-pass filter 102 is then fed to the input of the IF amplifier 101.

The IF amplifier 101 comprises three stages to amplify the signal to the required gain level. The first stage is a single-pole high-pass filter 104 with a fixed gain of 30 dB implemented with an op-amp. The second stage is a programmable gain amplifier 106 with gains of 0, 20, 40, and 60 dB. The gain of the amplifier 106 is set by sending the appropriate gain control bits from a processor or from a computer to the programmable gain amplifier 106 via a CIODIO-24 I/O board, for example. The final stage is a unity-gain buffer 108 used to boost the output current of the programmable gain amplifier 106 to a level sufficient for driving a 50 ohm load.

In accordance with one embodiment of the present invention, data acquisition is performed by digitizing the IF signal at the output of the IF amplifier 101 using a high-speed analog-to-digital convertor (A/D) board. A suitable A/D board to digitize the IF signal is model RTI-860 manufactured by Analog Devices. The RTI-860 A/D board is capable of sampling at a frequency of 250 kHz with 12-bit resolution in single-channel mode, and up to 200 kHz in a multi-channel mode. Sampling rates of up to 330 kHz in single-channel mode and 250 kHz in multi-channel mode can be achieved using 8-bits of resolution. For N-bit resolution, the maximum signal-to-noise ratio (SNR) that can be measured is given by the following equation:

$$SNR_{max} \sim t\ 6\times(N-1)-1.25 \text{(dB)} \quad [30]$$

Hence, for 8-bit resolution, the maximum SNR that can be measured is 40.75 dB, and for 12-bit resolution, the maximum measurable SNR is 64.75 dB.

An input voltage range of either +/−5 V or 10 V may be selected using the appropriate jumper. The digitized data can be stored in either on-board memory or system memory. The RTI-860 has 256K×12 bits of dynamic RAM (DRAM) for storing the acquired data without being interrupted by the computer's CPU. Three methods of triggering A/D conversion with the RTI-860 are available. These include digital, analog, and software triggering.

Digital signal triggering is a type of edge triggering that uses an external digital signal. The RTI-860 can be configured to trigger via software on either the falling edge or on the rising edge of the external digital signal. Analog triggering is accomplished by comparing an external analog input signal with a software-specified threshold voltage. The RTI-860 can be configured via software to trigger when the analog signal is above or below the specified threshold voltage. Software triggering initiates the A/D conversion process as soon as the user or host requests data.

In one embodiment, a sampling rate of 200 kHz with 12-bit resolution in multi-channel mode is selected, which effectively provides for a 50 kHz per channel sampling rate since there are a total of four channels. The trigger mechanism is a rising-edge digital-signal trigger that is synchronized to the sawtooth waveform. The digitized data are first stored in on-board DRAM and then transferred to system memory. The data acquisition program may be written in C language and, if desirable, interfaced with MATLAB software for purposes of performing data processing.

The advantages of the swept-step radar probing apparatus and method in accordance with the present invention and as described herein were demonstrated and verified by use of a MATLAB simulation approach. For purposes of concept verification, several operating scenarios were simulated, as are described below in Examples 1 through 5.

EXAMPLE 1

Figure 18:
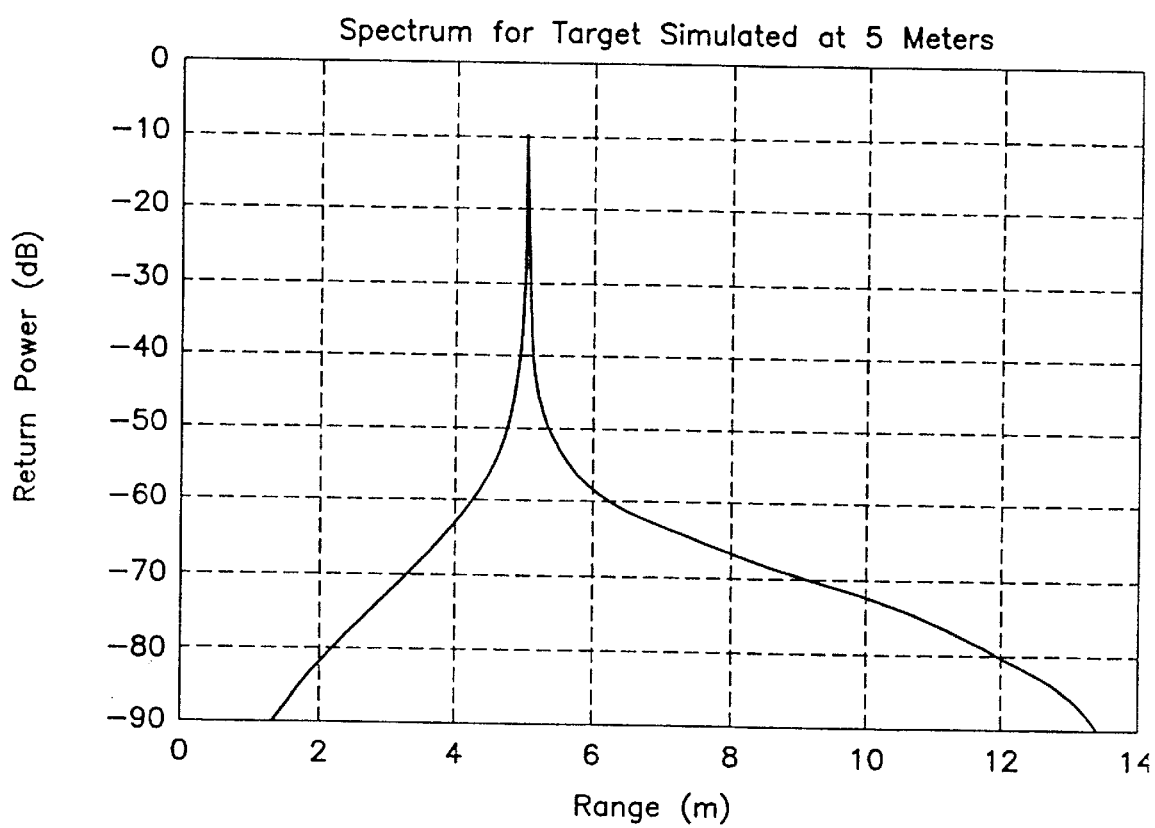
FIG. 18 is a graphical representation of a spectrum for a target simulated at a distance of 5 meters (m) from a swept-step radar system operating in a linear sweep mode from 2 to 18 GHz.

FIG. 18 is a graphical representation of a spectrum for a target simulated at a distance of 5 m from the swept-step radar operating in a linear sweep mode from 2 to 18 GHz. The plot of the spectrum data in FIG. 18 demonstrates unambiguous and accurate detection of the simulated target located at 5 m from the swept-step radar.

EXAMPLE 2

Figure 19:
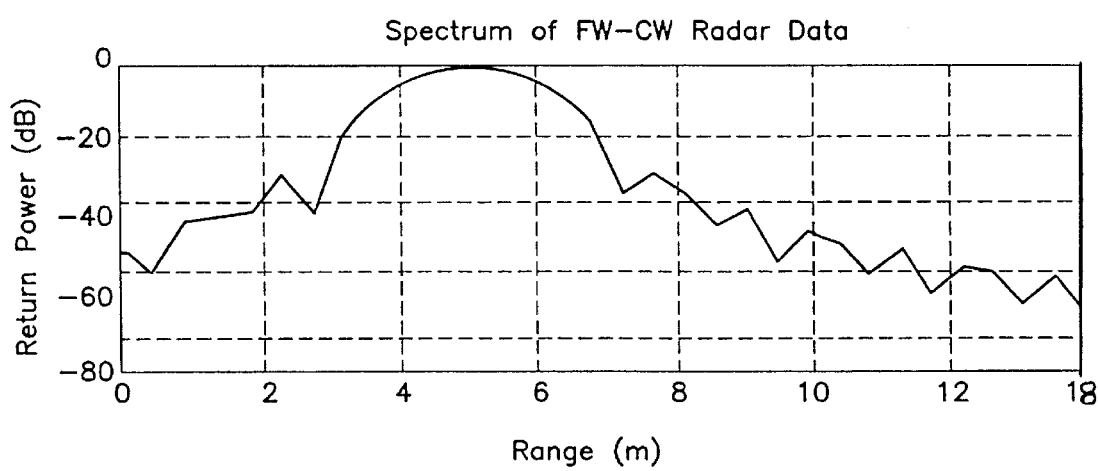
FIG. 19 graphically illustrates the spectrum of data for a conventional frequency-modulated, continuous-wave radar when attempting to resolve two targets simulated at 5 m and 5.05 m from the frequency-modulated, continuous-wave radar, respectively.
Figure 20:
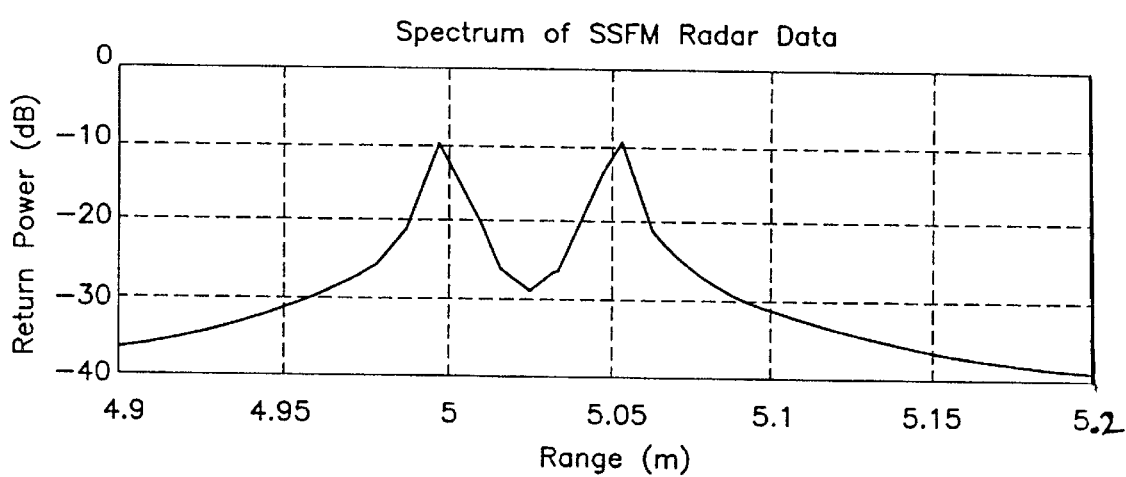
FIG. 20 graphically illustrates the capability of a swept-step radar system to accurately resolve two targets simulated at 5 m and 5.05 m from the swept-step radar system, respectively.

FIGS. 19 and 20 dramatically illustrate the high-resolution capability of the swept-step radar operating in accordance with the principles of the present invention in comparison to that provided by a conventional frequency-modulated, continuous-wave radar. FIG. 19 graphically illustrates the spectrum of data for a conventional frequency-modulated, continuous-wave radar when attempting to resolve two targets simulated at 5 m and 5.05 m from the radar, respectively. It can be seen from the plot in FIG. 19 that the conventional frequency-modulated, continuous-wave radar was unable to accurately resolve the two, closely spaced targets. Rather, the frequency-modulated, continuous-wave radar data suggests the presence of only a single target.

In stark contrast, as is illustrated in FIG. 20, the plot of spectrum data demonstrates that the swept-step radar clearly resolves the two targets simulated at 5 m and 5.05 m from the swept-step radar, which represents a separation distance of only 5 cm. It is noted that both the frequency-modulated, continuous-wave and swept-step radars were simulated so as to operate in a linear sweep mode from 2 to 18 GHz.

EXAMPLE 3

Figure 21:
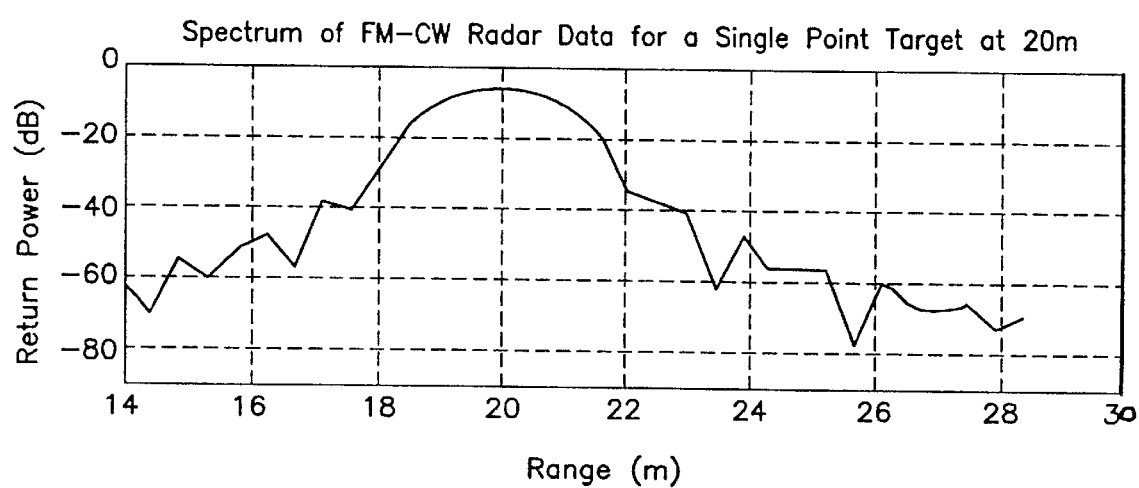
FIGS. 21 and 22 illustrate the spectrum of data for a simulated single point target located 20 m from a conventional frequency-modulated, continuous-wave radar and a swept-step radar, respectively.
Figure 22:
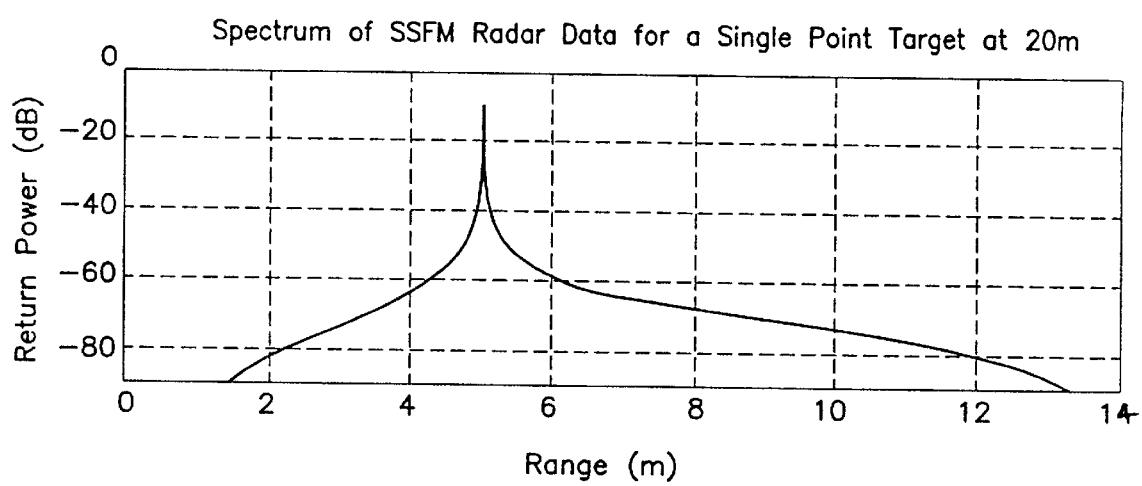

The data graphically presented in FIGS. 21 and 22 demonstrate that the range of the swept-step radar is co-extensive with that of a conventional frequency-modulated, continuous-wave radar. FIG. 21 illustrates the spectrum of data for a simulated single point target located 20 m from a conventional frequency-modulated, continuous-wave radar. FIG. 22 illustrates that the range of the swept-step radar is equivalent to that of the frequency-modulated, continuous-wave radar.

Previously, by using a network analyzer as a step-frequency radar, targets beyond 15 m could not be detected, which is a range limit determined by the number of points and the sweep bandwidth. As such, the spectrum obtained by the swept-step radar is simply wrapped around, and the corrected range, or actual range, can be determined from the plot shown in FIG. 22 by adding 15 m to the displayed range. As such, the swept-step radar, taking into account the additional 15 m offset (15 m+5 m=20 m), accurately detects the presence of the target located 20 m from the swept-step radar.

EXAMPLES 4 & 5

Figure 23:
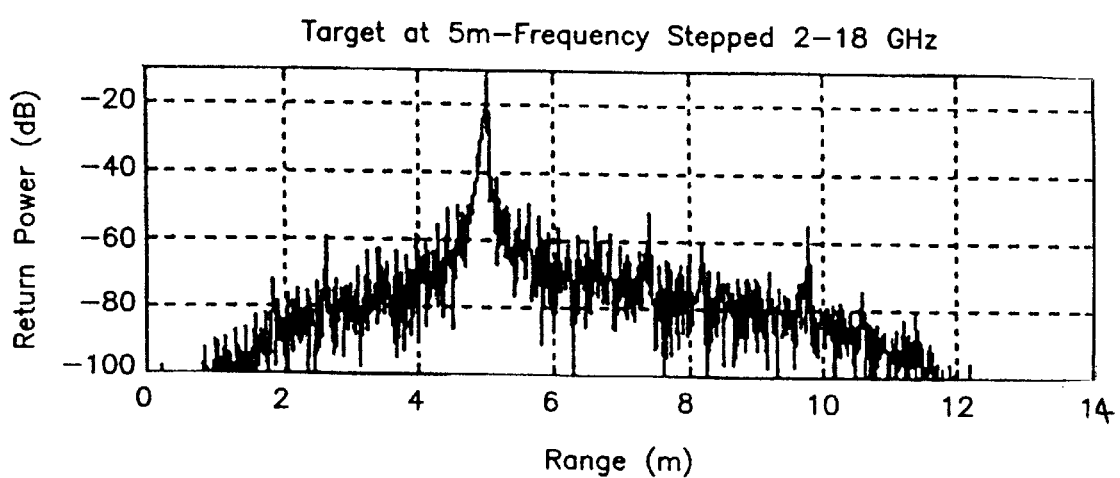
FIGS. 23 and 24 provide comparison data demonstrating swept-step radar performance when the frequency of the oscillator is swept the entire frequency range of 2 to 18 GHz, and when the oscillator is swept in the linear region of operation between 2.37 to 17.65 GHz, respectively.
Figure 24:
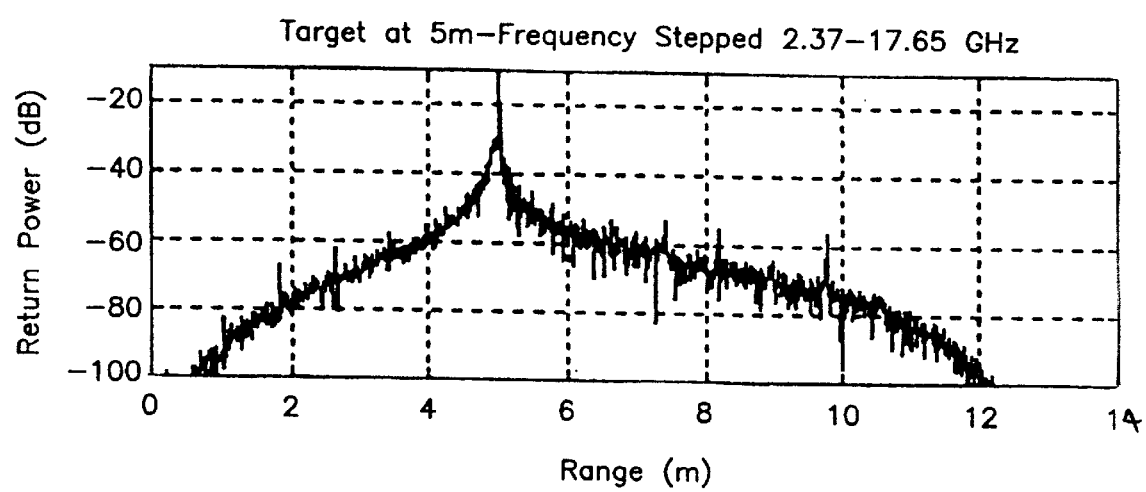

FIGS. 23 and 24 provide comparison data demonstrating swept-step radar performance when the frequency of the oscillator 60 is swept the entire frequency span of 2 to 18 GHz (FIG. 23), and when the oscillator 60 is swept in the linear region of operation from 2.37 to 17.65 GHz (FIG. 24). It can be seen in these figures that degradation in the performance of the radar results when the frequency steps of the oscillator 60 are not uniform. The linearity of the sweep was determined by measuring the oscillator's actual frequency and removing the straight-line fit from these frequencies. The results of these measurements were discussed previously in connection with the description of the YIG oscillator.

Figure 5:
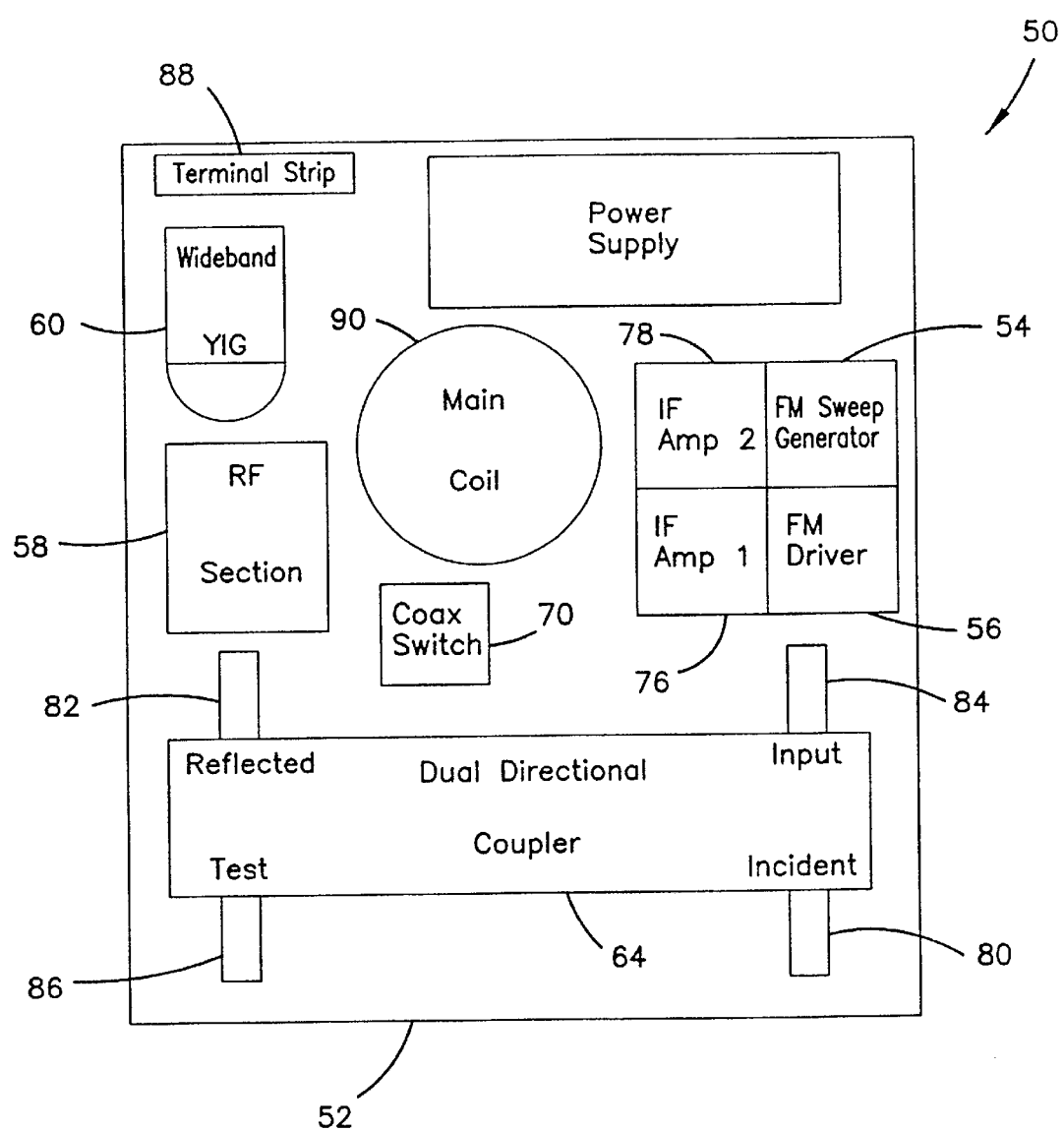
FIG. 5 is a top plan view of a swept-step radar system disposed in a housing in accordance with an embodiment of the present invention.
Figure 6:
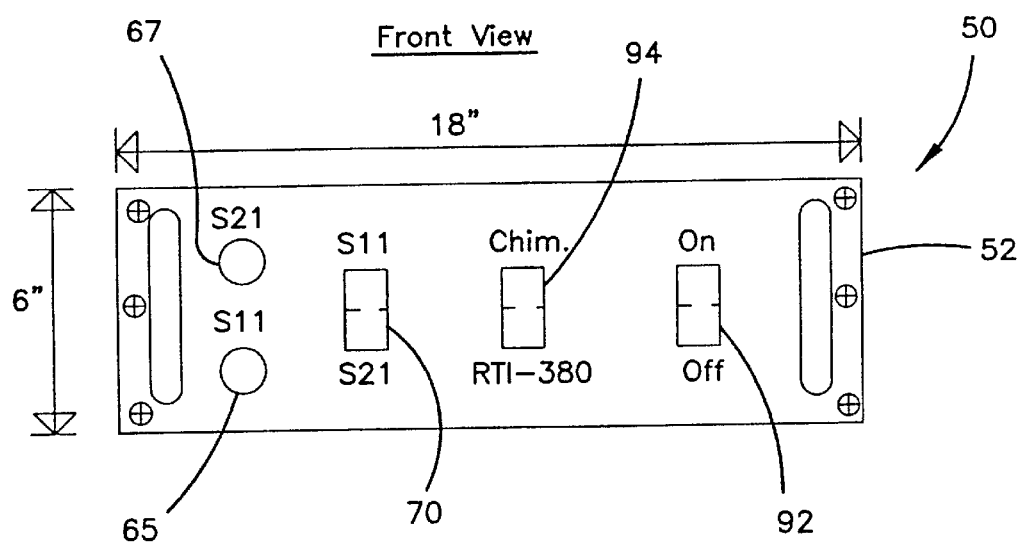
FIG. 6 is a front plan view of the swept-step radar system housing shown in FIG. 5.

An advantageous feature of the swept-step radar in accordance with the embodiment of the invention shown in FIGS. 5–7 concerns the portablity of the system, which is particularly advantageous when performing material permittivity measurements, for example. Obtaining accurate permittivity measurements using known techniques is achieved without necessity of relatively bulky network analyzer equipment, which is generally required when employing a conventional permittivity measuring system.

Figure 25:
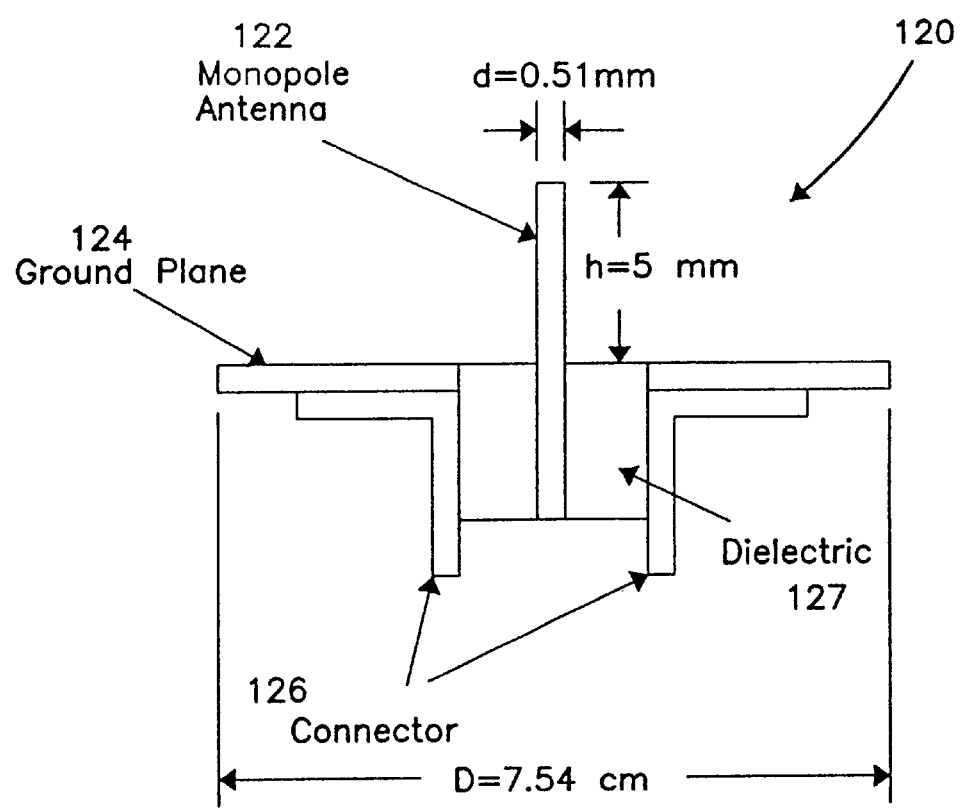
FIG. 25 illustrates a configuration of a monopole antenna used in cooperation with a swept-step radar system to measure the relative permittivity of various materials.

To facilitate permittivity measurements using a swept-step radar which operates in accordance with the principles of the present invention, a cylindrical monopole antenna apparatus 120, an embodiment of which is illustrated in FIG. 25, was constructed. It is noted that a known permittivity measurement technique involves the use of a flat-plate antenna for radiating a single-frequency probe signal. In order to measure the relative permittivity of a material accurately, it is desirable that the material be disturbed as little as possible during testing. It is noted that the monopole antenna apparatus 120 was selected because of the ease by which this antenna configuration may be used when preparing the sample material for permittivity measurement testing. Only one hole, having a length equal to that of the monopole antenna 122, needs to be drilled into the sample material in order to immerse the antenna 122 into the medium.

In modeling the input impedance of the monopole antenna 122, an antenna length (h) was selected, and a diameter (d) was then determined such that the antenna input reactance was zero. It was determined that the ratio of length (h) to diameter (d) should be at least 10 in order to obtain the desired resonation characteristic. The length (h) of the monopole antenna 122 at the first resonant frequency is given by the following equation:

$$h = \frac{0.24c}{f} - \frac{d}{2} \qquad [31]$$

Figure 26:
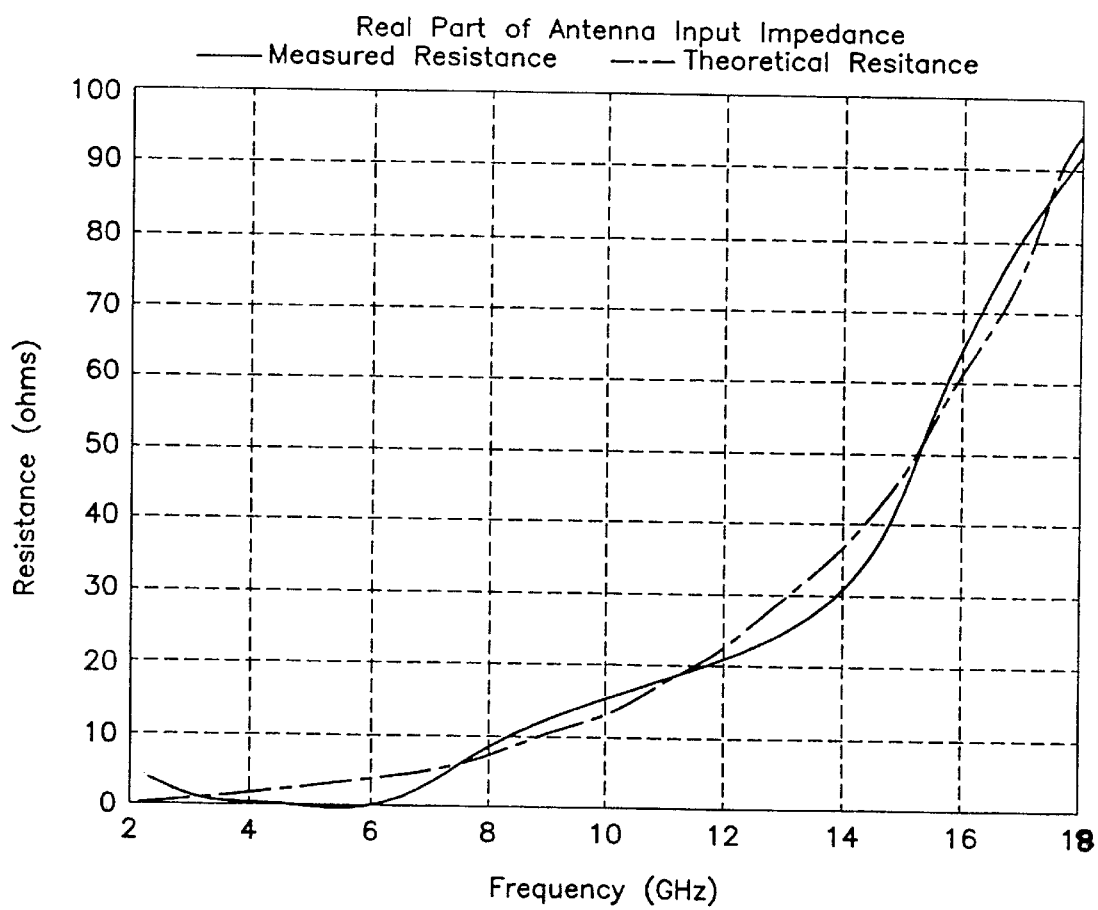
FIGS. 26 and 27 graphically illustrate the real and imaginary parts of measured and theoretical input impedance of the antenna shown in FIG. 25.
Figure 27:
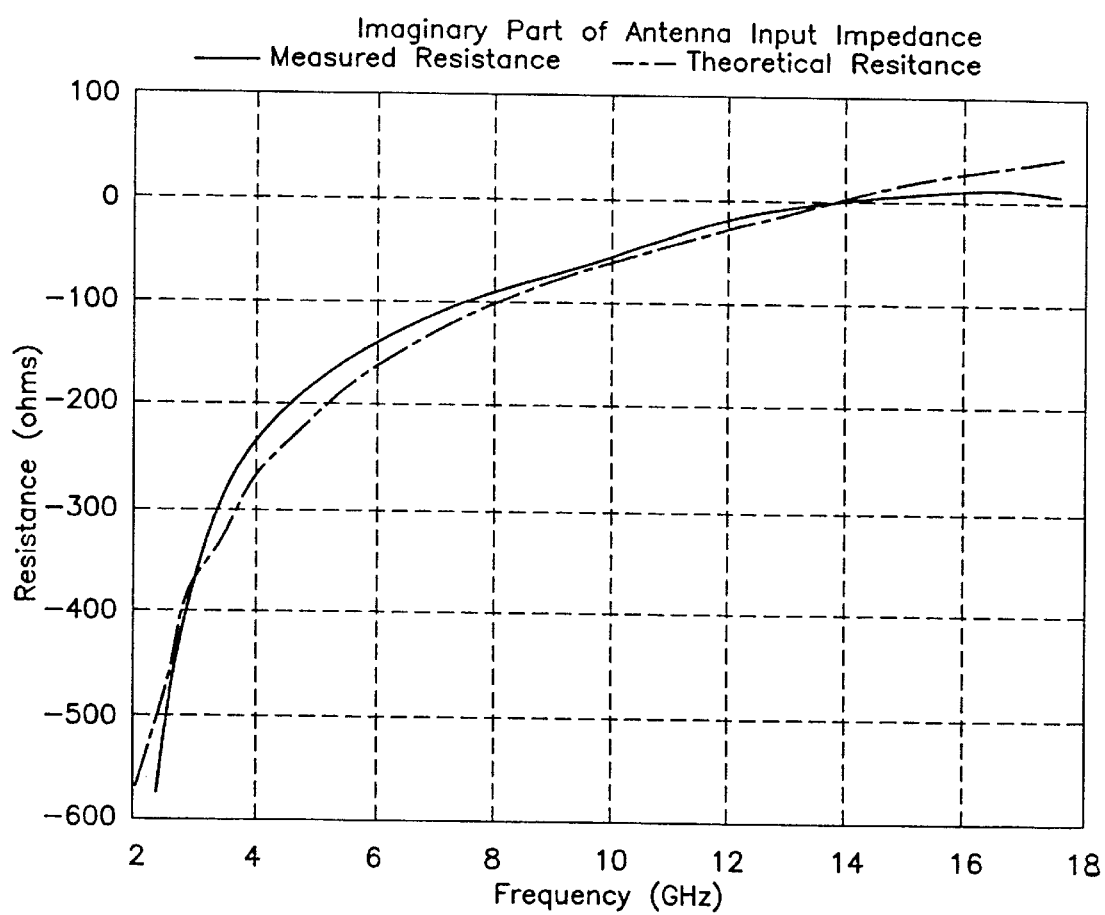

The length (h) of the antenna 122 was determined to be 5 mm, and the diameter (d) was determined to be 0.5 mm, based on a resonant frequency of 14 GHz and an h/d ratio of 10. A larger h/d ratio may be desirable in terms of modeling the input impedance but, in practice, larger h/d rations would result in a smaller antenna diameter and, hence, a thinner antenna. A thinner antenna may be impractical because drilling narrow holes into sample material may be difficult, and the antenna may be subject to frequent breakage. The measured and theoretical input impedance in free space calculated using a conventional moment method are shown in FIGS. 26 and 27. FIG. 26 shows the real part of the antenna input impedance, while FIG. 27 illustrates the imaginary part of the antenna input impedance.

The radiation efficiency of the antenna system 120 depicted in FIG. 25 is dependent in part on the ground plane 124 of the antenna apparatus 120. In general, the radius of the ground plane 124 should be at least a quarter wavelength at the lowest operating frequency. Since, in accordance with one embodiment, the lowest operating frequency is 2 GHz, a suitable ground plane should be constructed to have a diameter of 7.54 cm.

In order to measure the relative permittivity of materials using the monopole antenna apparatus 120 shown in FIG. 25, the input impedance of the antenna 120 in the measured medium is to be determined. The relationship between the input impedance (Z) of the antenna 120 in a medium and the reflection coefficient (Γ) of the medium is given by the following equation:

$$Z(\omega, \varepsilon) = Z_0 \frac{1 + \Gamma(\omega, \varepsilon)}{1 - \Gamma(\omega, \varepsilon)} \qquad [32]$$

where, $Z_0$ represents the characteristic impedance of the transmission line (i.e., 50 ohm).

Deschamps' theorem states that for a short monopole antenna, the relationship between the input impedance of the antenna immersed in two mediums with different permittivity is given by:

$$\sqrt{\varepsilon_{r1}} Z_1(\omega_1, \varepsilon_{r1}) = \sqrt{\varepsilon_{r2}} Z_2(\omega_2, \varepsilon_{r2}) \qquad [33]$$

It is understood that the input impedance of the antenna 120 can be modeled in terms of the complex wave number, k, and the physical length of the antenna, h, by a rational function. The normalized input impedance is given as:

$$Z_n(kh) = \sqrt{\varepsilon_r}\, Z(\omega, \varepsilon_r) \qquad [34]$$
$$= \frac{kh}{k_o h} Z(\omega, \varepsilon_r)$$

where, $k_o$ represents the wavenumber in free space $(2\pi/\lambda)$, and $Z_n(kh)$ represents the normalized input impedance that can be modeled by the following rational function of order m+1:

$$Z_n(kh) \approx j\frac{K}{kh}\left[\frac{1 + jb_1(kh) + b_2(kh)^2 + jb_3(kh)^3 + \ldots + b_m(kh)^m}{1 + ja_1(kh) + a_2(kh)^2 + ja_3(kh)^3 + \ldots + a_m(kh)^m}\right] \qquad [35]$$

This model assumes the presence of antenna resonance. Accordingly, it is considered desirable that the antenna 120 be designed so that the ratio of the antenna length (h) to the diameter (d) (i.e., h/d) is greater than ten.

To determine the relative permittivity of materials, the following procedure may be employed. Initially, the input impedance of antenna 120 in air is determined. These data are used to determine the coefficients in Equation [35]

above. For a third order rational function, an algebraic solution is given for the coefficients. The input impedance of the antenna is then measured in the material. The value of kh is then determined using Equations [33] and [34]. It is noted that the data are valid over the frequency range where $|kh| <= k_o h|_{res}$. Finally, the relative permittivity, $\epsilon_r$, is determined by:

$$\varepsilon_r = \left(\frac{kh}{k_o h}\right)^2 \quad [36]$$

The accuracy of the relative permittivity is dependent on the accuracy of the measurement of the reflection coefficient. To obtain accurate measurement of the reflection coefficient at the test port 86, the system should be calibrated up to the point of measurement. A suggested calibration approach can be described by the equations below:

$$H(f) = \frac{-1}{S(f)} \quad [37]$$

$$\Gamma_M(f) = H(f) \times M(f) \quad [38]$$

where, S(f) represents the measured reflection from the short circuit load, H(f) represents the calibration factor, M(f) represents the measured reflection from the medium, and $\Gamma_M(f)$ represents the true reflection from the medium.

Figure 28:
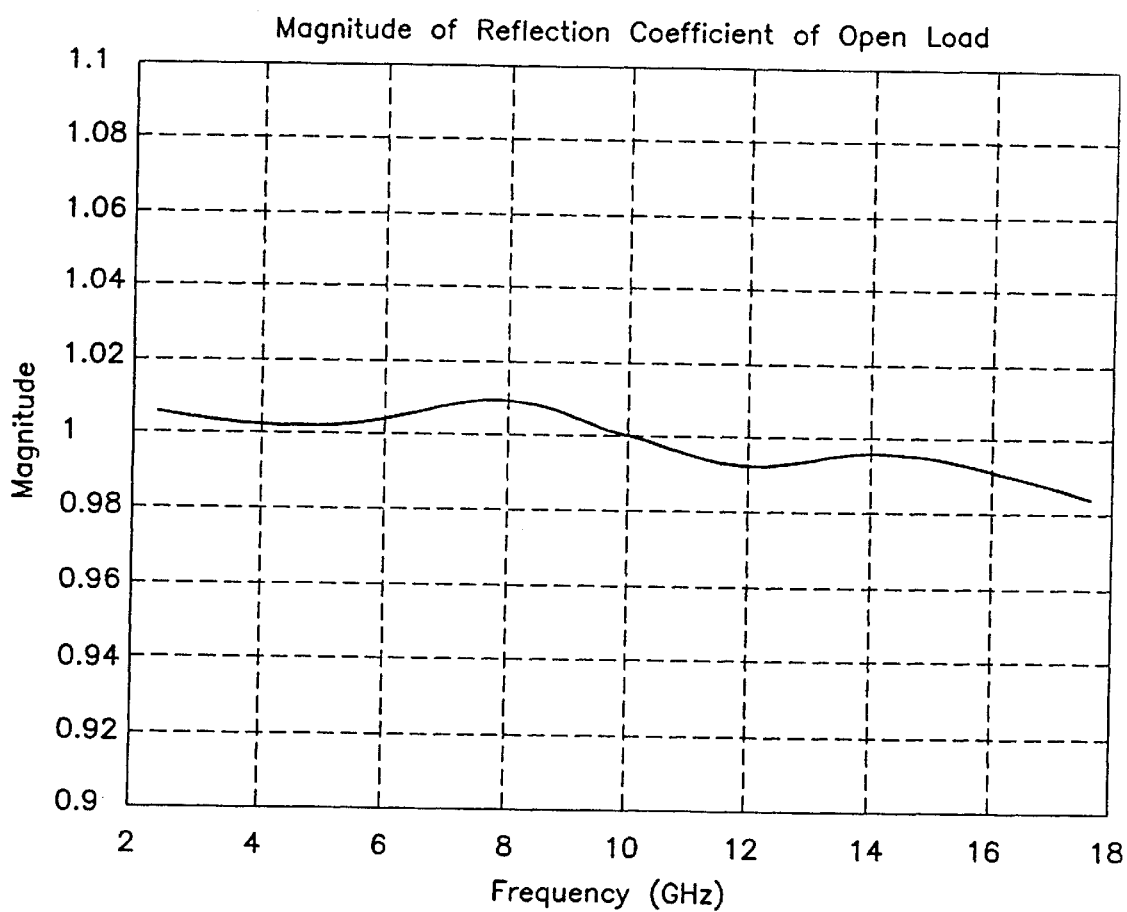
FIGS. 28 and 29 are graphical illustrations of the magnitude and phase of the reflection coefficient of an open load, and demonstrate the efficacy of a technique for calibrating a swept-step radar system employing a monopole antenna to measure the permittivity of materials.
Figure 29:
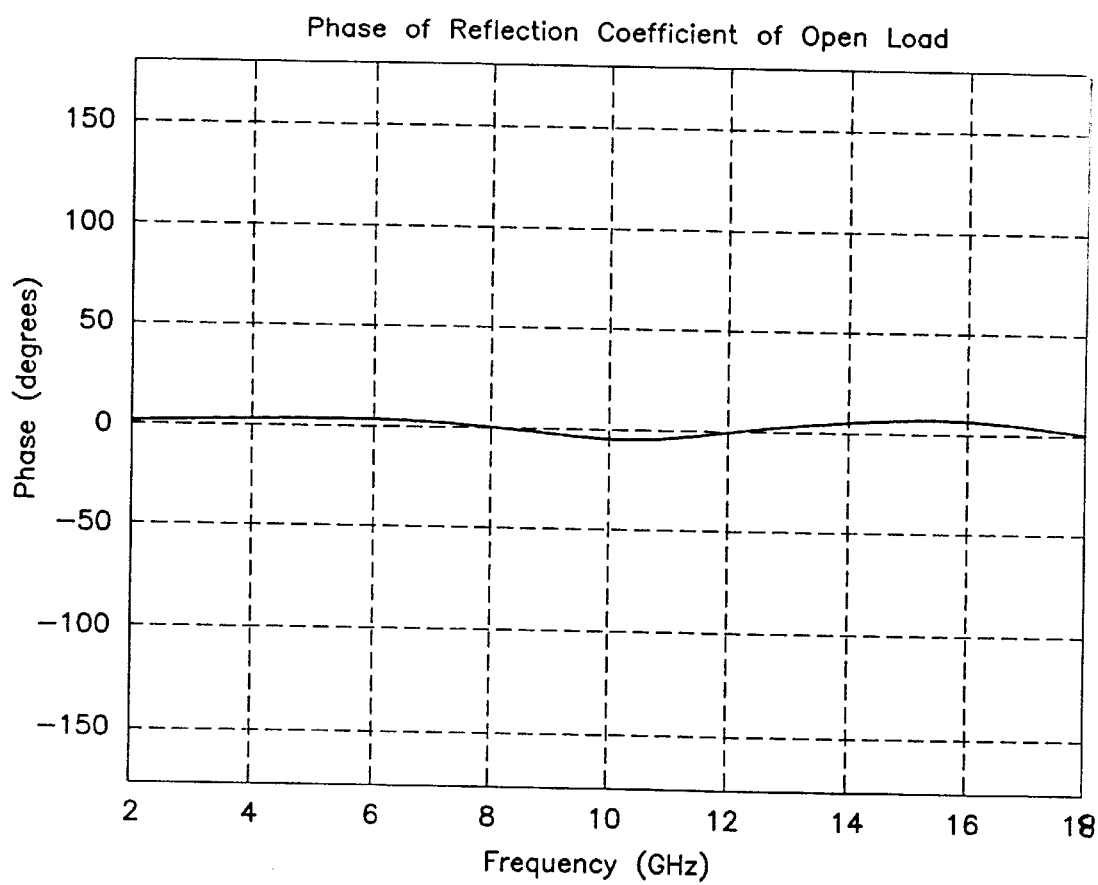

The system may be calibrated by measuring the reflection coefficient of the short circuit, S(f), at the test point. The calibration factor, H(f), is obtained by dividing the true reflection of the short circuit load, which is −1, by S(f). This function, H(f), is multiplied by the measured reflection from the medium to obtain the true reflection from the medium, $\Gamma_M(f)$. FIGS. 28 and 29 demonstrate the accuracy of this calibration technique. Using this technique, the reflection coefficient of an open load ($\Gamma_{open}=1$) with less than 2% error in magnitude (FIG. 28) and less than 3% error in phase (FIG. 29) across the frequency range may be obtained.

Figure 30:
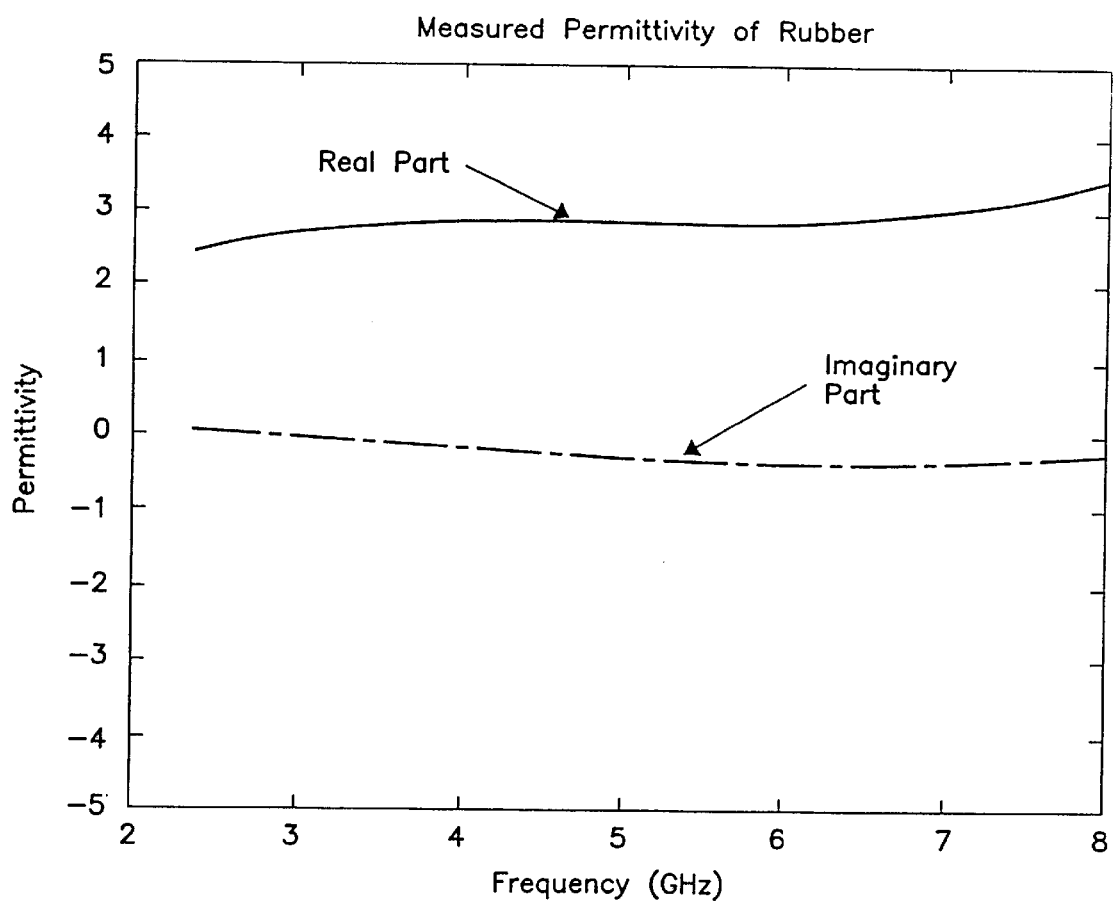
FIG. 30 is a graph illustrating a measurement of the relative permittivity of a rubber sample obtained using a swept-step radar coupled to a monopole antenna.
Figure 31:
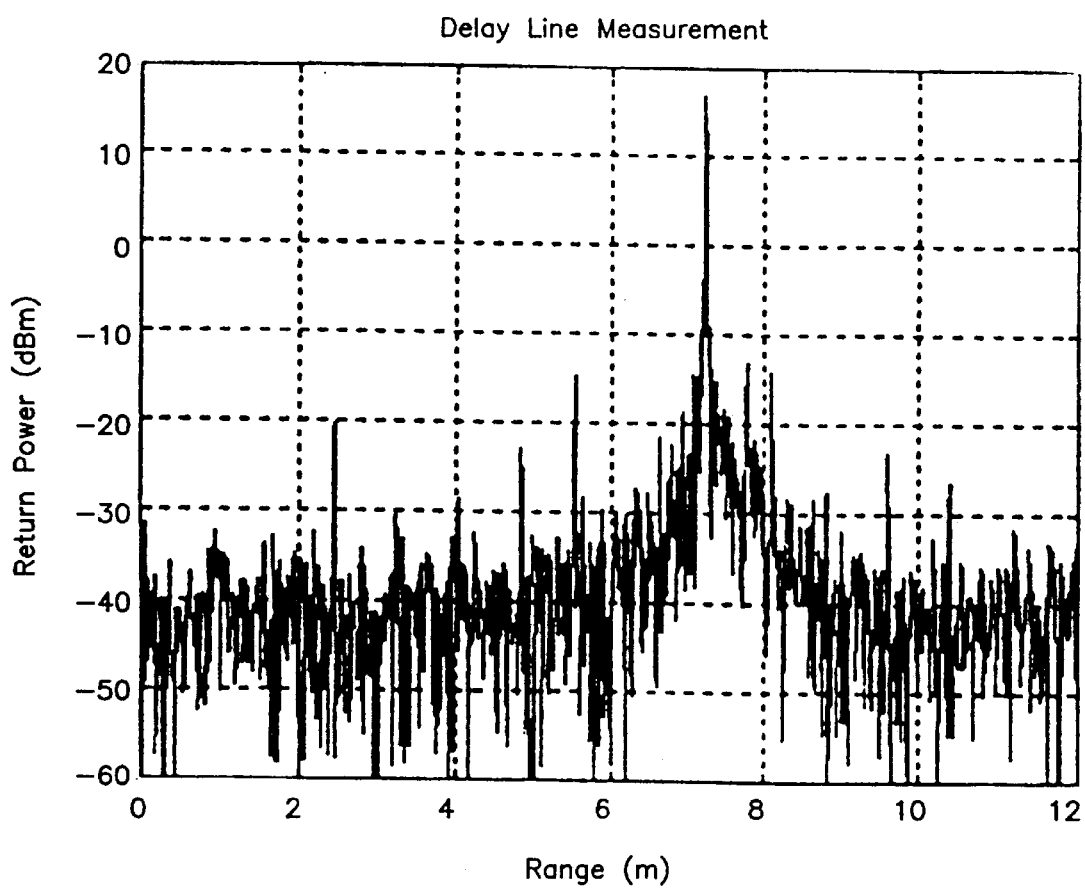
FIG. 31 is a graphical illustration of a delay line measurement associated with a swept-step radar operating in a bistatic mode.

FIG. 30 shows the relative permittivity of a rubber sample obtained using a monopole antenna in accordance with the above-discussed procedure. The theoretical relative permittivity is given as 3 for the real part and 0 for the imaginary part. FIG. 30 demonstrates close agreement between the empirically determined permittivity of the rubber sample through use of the monopole antenna 120 and the theoretically derived permittivity value. It is noted that FIG. 31 illustrates the results of a delay line measurement made in the $S_{21}$ mode of operation with 0-dB gain.

It is believed that the performance of the swept-step radar may be further improved by linearizing the frequency steps by using a direct digital synthesizer (DDS). It is further believed that the IF spectrum can be further improved if the IF signal is weighted by a window, such as a Hamming window, before it is input into the range gating filter to reduce the effects of ringing.

It will, of course, be understood that various modifications and additions can be made to the various embodiments discussed hereinabove without departing from the scope or spirit of the present invention. Accordingly, the scope of the present invention should not be limited by the particular embodiments described above, but should be defined only by the claims set forth below and equivalents thereof.

What is claimed is:

1. A method of detecting an object, comprising:
    (a) transmitting a probe signal having a center frequency and a sweep bandwidth;
    (b) receiving a return signal resulting from the probe signal;
    (c) storing information corresponding to the object derived by using the return signal;
    (d) shifting the center frequency;
    (e) repeating steps (a) through (d) a number of times; and
    (f) determining a range to the object using the stored information.

2. The method of claim 1, wherein storing the information comprises storing magnitude and phase information corresponding to the object derived by using the return signal.

3. The method of claim 2, wherein determining the range comprises determining the range to the object using the stored magnitude and phase information.

4. The method of claim 1, wherein the probe signal comprises a frequency-modulated probe signal.

5. The method of claim 1, wherein shifting the center frequency comprises shifting the center frequency within a frequency range of approximately 2 GHz to approximately 18 GHz.

6. The method of claim 1, wherein shifting the center frequency comprises changing the sweep bandwidth.

7. The method of claim 1, wherein shifting the center frequency further comprises linearizing a plurality of frequency steps over which the center frequency is shifted.

8. The method of claim 1, further comprising range-gate filtering the return signal.

9. The method of claim 1, wherein determining the range further comprises determining the range of the object where the object is situated less than approximately 3 meters relative to a location at which transmitting the probe signal occurs.

10. The method of claim 1, wherein the object is an underground object.

11. The method of claim 1, wherein transmitting the probe signal comprises transmitting the probe signal using an antenna, the method further comprising:
    determining, with the antenna immersed in a first medium, a first input impedance of the antenna;
    determining, with the antenna immersed in a second medium, a second input impedance of the antenna; and
    determining a relative permattivity of the first medium using the first and second input impedances.

12. The method of claim 1, wherein the first medium comprises substantially solid material, and the second medium comprises a fluid.

13. The method of claim 1, further comprising producing a difference signal using the probe signal and the return signal, wherein storing the information further comprises storing information associated with the difference signal corresponding to the object.

14. The method of claim 13, further comprising applying a window function to the difference signal, and range-gate filtering the windowed difference signal.

15. A system for detecting an object, comprising:
    a transmitter, coupled to an antenna, that transmits a frequency-modulated probe signal having a center frequency and a sweep bandwidth;
    a receiver, coupled to the antenna, that receives a return signal resulting from the probe signal;
    a frequency selector that controls shifting of the probe signal center frequency to a number of center frequency values;
    a memory that stores information of the return signal resulting from transmission of the probe signal at each of the center frequency values; and a processor, coupled to the memory, that computes a range to the object using the information stored in the memory.

16. The system of claim 15, wherein the memory stores magnitude and phase information of the return signal, and the processor computes the range to the object using the magnitude and phase information stored in the memory.

17. The system of claim 15, further comprising a filter coupled to the antenna and the receiver that suppresses reflections from the antenna.

18. The system of claim 17, wherein the filter operates as a range- gating filter.

19. The system of claim 15, further comprising a linearizing circuit coupled to the processor, the linearizing circuit linearizing a plurality of frequency steps over which the center frequency is shifted.

20. The system of claim 19, wherein the linearizing circuit comprises a digital synthesizer circuit.

21. The system of claim 15, wherein the frequency selector controls adjustment of the sweep bandwidth.

22. A system for detecting an object, comprising:
   means for transmitting a probe signal having a center frequency and a sweep bandwidth;
   means for receiving a return signal resulting from the probe signal;
   means for shifting the center frequency to a number of center frequency values;
   memory for storing information corresponding to the object derived by using the return signal at each of the center frequency values; and
   means for computing a range to the object using the information stored in the memory.

23. The system of claim 22, wherein the storing means comprises means for storing magnitude and phase information corresponding to the object derived by using the return signal.

24. The system of claim 23, wherein the computing means comprises means for computing the range to the object using the stored magnitude and phase information.

25. The system of claim 22, wherein the probe signal comprises a frequency-modulated probe signal.

26. The system of claim 22, wherein the shifting means comprises means for shifting the center frequency within a frequency range of approximately 2 GHz to approximately 18 GHz.

27. The system of claim 22, wherein the shifting means comprises means for changing the sweep bandwidth.

28. The system of claim 22, wherein the shifting means comprises means for linearizing a plurality of frequency steps over which the center frequency is shifted.

29. The system of claim 22, further comprising means for range-gate filtering the return signal.

30. The system of claim 22, wherein the object is an underground object.

31. The system of claim 22, further comprising an antenna coupled to the transmitting means and the receiving means, respectively, and the system further comprises:
   means for determining, with the antenna immersed in a first medium, a first input impedance of the antenna;
   means for determining, with the antenna immersed in a second medium, a second input impedance of the antenna; and
   means for determining a relative permittivity of the first medium using the first and second input impedances.

32. The system of claim 31, wherein the first medium comprises substantially solid material, and the second medium comprises a fluid.

33. The system of claim 22, further comprising means for producing a difference signal using the probe signal and the return signal, wherein the storing means comprises means for storing the information associated with the difference signal corresponding to the object.

34. The system of claim 33, further comprising:
   means for applying a window function to the difference signal; and
   means for range-gate filtering the windowed difference signal.

* * * * *

UNITED STATES PATENT AND TRADEMARK OFFICE
CERTIFICATE OF CORRECTION

PATENT NO. : 6,225,941 B1
DATED : May 1, 2001
INVENTOR(S) : Gogineni et al.

Page 1 of 1

It is certified that error appears in the above-identified patent and that said Letters Patent is hereby corrected as shown below:

<u>Title page,</u>
In Related U.S. Application Data section, please insert -- Continuation of application No. 08/788, 355, filed December 13, 1996, now Patent No. 5,867,177. --

Signed and Sealed this

Thirteenth Day of November, 2001

Attest:

*Nicholas P. Godici*

NICHOLAS P. GODICI
*Attesting Officer*     *Acting Director of the United States Patent and Trademark Office*